(12) United States Patent
Sofue et al.

(10) Patent No.: US 12,515,483 B2
(45) Date of Patent: Jan. 6, 2026

(54) TIRE

(71) Applicant: Sumitomo Rubber Industries, Ltd., Hyogo (JP)

(72) Inventors: Naoya Sofue, Kobe (JP); Takuma Yoshizumi, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 29 days.

(21) Appl. No.: 18/255,986

(22) PCT Filed: Sep. 17, 2021

(86) PCT No.: PCT/JP2021/034319
§ 371 (c)(1),
(2) Date: Jun. 5, 2023

(87) PCT Pub. No.: WO2022/123854
PCT Pub. Date: Jun. 16, 2022

(65) Prior Publication Data
US 2024/0042813 A1    Feb. 8, 2024

(30) Foreign Application Priority Data
Dec. 7, 2020 (JP) ................................ 2020-202671

(51) Int. Cl.
*B60C 23/04* (2006.01)
*B60C 11/00* (2006.01)

(52) U.S. Cl.
CPC .. *B60C 23/0493* (2013.01); *B60C 2011/0016* (2013.01); *B60C 2011/0025* (2013.01); *B60C 2011/0033* (2013.01); *B60C 2200/04* (2013.01)

(58) Field of Classification Search
CPC .......... B60C 23/0493; B60C 2019/004; B60C 2011/0025; B60C 2011/0016; B60C 2011/0033
See application file for complete search history.

(56) References Cited

U.S. PATENT DOCUMENTS 11,400,771 B2    8/2022 Usami
2020/0376897 A1*    12/2020 Bourgeois ............. B60C 11/033
(Continued)

FOREIGN PATENT DOCUMENTS

JP    2003291610 A  *  10/2003
JP    2018-016185 A    2/2018
(Continued)

OTHER PUBLICATIONS

JP 2003-291610 Machine Translation; Ota, Takeshi (Year: 2003).*
(Continued)

*Primary Examiner* — Justin R Fischer
*Assistant Examiner* — Nicholas J Weiler
(74) *Attorney, Agent, or Firm* — Studebaker Brackett PLLC

(57) ABSTRACT

Provided is a tire having excellent peeling resistance such that it is unsusceptible to having an electronic component peel off from the surface of the tire, even when a large impact is exerted on the tire during high-speed travel. An electronic component attachment member for embedding an electronic component is attached to a surface of a tire inner member disposed in a tire inner cavity. The electronic component attachment member comprises an electronic component storage part for storing an electronic component, and a bonding part having a bonding surface for attaching the electronic component attachment member to the surface of the tire inner member. A line that passes through the center point of the bonding surface of the electronic component attachment member with the tire inner cavity surface and that is perpendicular to the surface profile of a tread part does not pass through a circumferential-direction groove formed in the surface of the tread part, and the complex elastic modulus E*t (MPa) of tread rubber constituting the tread part at 30° C. satisfy E*r/E*t.

10 Claims, 3 Drawing Sheets

(56) References Cited

U.S. PATENT DOCUMENTS

| | | | | |
|---|---|---|---|---|
| 2021/0070117 A1* | 3/2021 | Giannini | ............ | B60C 23/0493 |
| 2022/0055424 A1* | 2/2022 | Puppi | ...................... | C09J 7/383 |
| 2023/0072567 A1* | 3/2023 | Suzuki | ................. | B60C 11/005 |

FOREIGN PATENT DOCUMENTS

| | | |
|---|---|---|
| JP | 2018-199396 A | 12/2018 |
| JP | 2019-023594 A | 2/2019 |
| JP | 2019-026218 A | 2/2019 |

OTHER PUBLICATIONS

International Search Report issued in PCT/JP2021/034319; mailed Nov. 22, 2021.

International Preliminary Report on Patentability and Written Opinion issued in PCT/JP2021/034319; issued Jun. 13, 2023.

\* cited by examiner

TIRE

TECHNICAL FIELD

The present disclosure relates to a tire in which an electronic component mounting member with a built-in electronic component is provided on the surface of a tire inner member arranged in a tire inner cavity.

BACKGROUND ART

In order to run a vehicle comfortably, it is considered important to properly manage the air pressure of the installed tires. In recent years, it is becoming common to install tire pressure monitoring systems (TPMS) inside (for example, Patent Documents 1 to 4).

PRIOR ART DOCUMENTS

Patent Documents

[Patent Document 1] JP-2018-016185A
[Patent Document 2] JP-2018-199396A
[Patent Document 3] JP-2019-023594A
[Patent Document 4] JP-2019-026218A

SUMMARY OF INVENTION

Problem to be Solved by the Invention

A sensor such as a TPMS is generally an electronic component made of metal, so there is a concern that it will peel off when it rolls, if it is directly attached to a rubber tire. In particular, there is a concern that the electronic component mounting member may peel off from the tire surface when a large impact such as running over a step is applied while the vehicle is running at high speed.

Accordingly, an object of the present disclosure is to provide a tire having excellent peeling resistance in which electronic components are less likely to peel from the tire surface even when a large impact is applied during high-speed running.

Means for Solving the Problem

The inventors of the present disclosure conducted intensive studies on how to solve the above problems, found that the above problems can be solved by the disclosure described below, and completed the present disclosure.

The present disclosure is;
  a tire mounting an electronic component mounting member with a built-in electronic component on the surface of the tire inner member, characterized in that,
  the electronic component mounting member includes an electronic component storage portion that stores the electronic component, and a joint portion that includes a joint surface for mounting the electronic component mounting member on the surface of the tire inner member;
  a line passing through the center point of the joint surface of the electronic component mounting member with the tire inner cavity surface and perpendicular to the surface profile of the tread portion does not pass through the circumferential groove formed on the surface of the tread portion; and
  the complex elastic modulus $E^*_r$ (MPa) of the joint portion at 30° C. and the complex elastic modulus $E^*_t$ (MPa) of the tread rubber constituting the tread portion at 30° C. satisfy the following (formula 1).

$$E^*_r/E^*_t < 1 \qquad \text{(formula 1)}$$

Effect of the Invention

According to the present disclosure, it is possible to provide a tire having excellent peeling resistance in which the electronic component mounting member is less likely to peel from the tire surface even when a large impact is applied during high-speed running.

EMBODIMENTS FOR CARRYING OUT THE INVENTION

Figure 1:
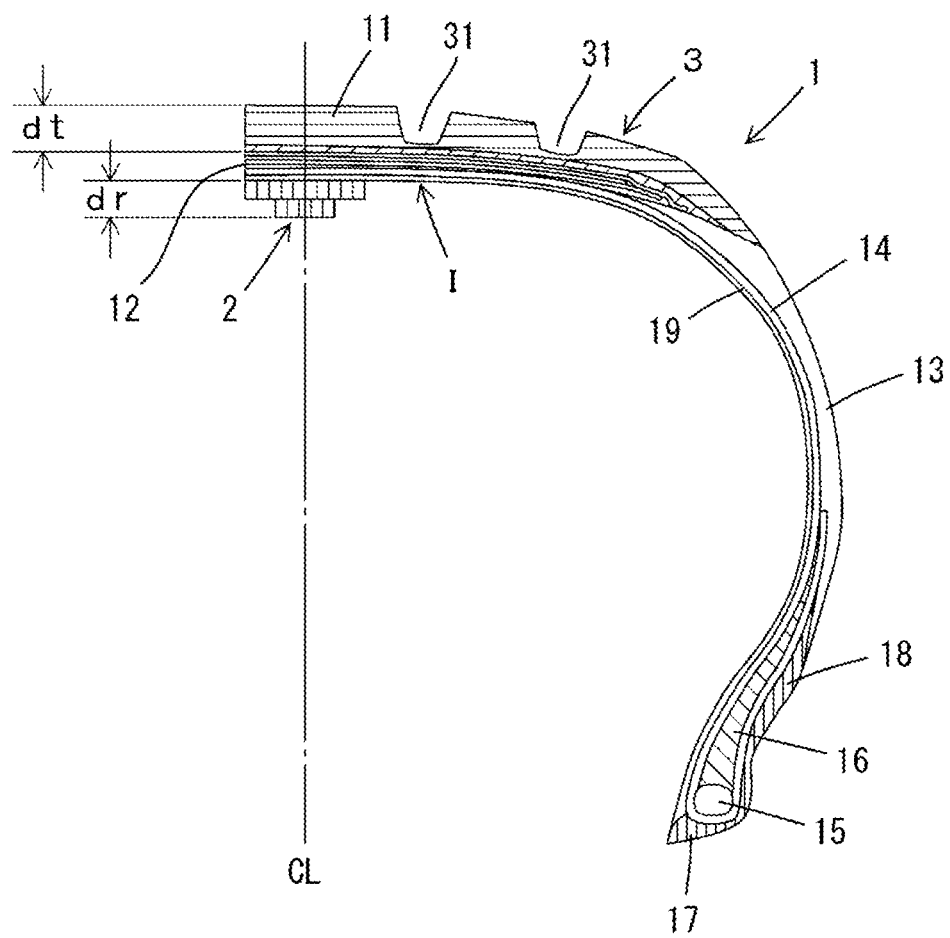
FIG. 1 is a cross-sectional view showing the configuration of a tire according to an embodiment of the present disclosure.

[1] Features of the Tire According to the Present Disclosure

First, the features of the tire according to the present disclosure will be described.

1. Overview

A tire according to the present disclosure is a tire in which an electronic component mounting member for embedding an electronic component is mounted on the surface of a tire inner member arranged in a tire inner cavity. The electronic component mounting member includes an electronic component storage portion that stores the electronic component, and a joint portion having a joint surface for mounting the electronic component mounting member on the surface of the tire inner member. A line passing through the center point of the joint surface of the electronic component mounting member with the inner cavity surface of the tire and perpendicular to the surface profile of the tread portion does not pass through the circumferential groove formed on the surface of the tread portion. Furthermore, the complex elastic modulus $E^*_r$ (MPa) of the joint portion at 30° C. and the complex elastic modulus $E^*_t$ (MPa) of the tread rubber constituting the tread portion at 30° C. satisfy the following (formula 1).

$$E^*_r/E^*_t < 1 \qquad \text{(formula 1)}$$

By making the tire as described above, as will be described later, a tire having excellent peeling resistance is provided in which the electronic component mounting member is less likely to peel off from the tire surface, even when a large impact is applied during high-speed running.

In the above description, the "circumferential groove formed on the surface of the tread portion" refers to a groove with a width of 2 mm or more extending continuously in the circumferential direction. Grooves that are not continuous all the way around, such as a sipe or a decorative groove, are not included. The shape of the circumferential groove is not limited as long as it is a groove extending continuously in a circumferential direction, and it may be a curved groove or a zigzag groove.

In addition, when the tread portion is composed of a plurality of tread rubber layers, in the above description, the tread rubber layer refers the rubber layer with the largest area among the rubber layers on the radially outer side the line parallel to the tread profile passing through 95% of the depth of the circumferential grooves on both sides, when the tread land portion, that passes through the center line of the joint surface of the electronic component mounting member in the tire cross section, and where a line perpendicular to the surface profile of the tread portion passes, is divided by two circumferential grooves; and the rubber layer with the largest area among the rubber layers on the radially outer side the line parallel to the tread profile passing through 95% of the depth of the circumferential grooves, when the tread land portion is divided by the ground contact edge and the circumferential groove.

In the above description, the circumferential groove depth is the shortest distance between the line connecting the tread surface end portions of the groove and the groove bottom surface.

In the above description, $E^*_r$ and $E^*_t$ are measured according to the provisions of JIS K 6394 using a viscoelasticity measuring device such as "EPLEXOR (registered trademark)" manufactured by GABO under the conditions of the temperature of 30° C., the initial strain of 5%, the dynamic strain rate of ±1%, the frequency of 10 Hz, and deformation mode: tension.

In the present disclosure, when the joint portion of the electronic component mounting member and the electronic component storage portion are made of the same rubber composition, the viscoelasticity of the electronic component storage portion is substituted for the viscoelasticity of the joint portion.

2. Mechanism of Manifestation of Effect in Tires According to the Present Disclosure The mechanism of manifestation of effect in the tire according to the present disclosure is considered as follows.

When tire rolls, the tread portion is deformed around the groove bottom of the circumferential groove, so the deformation of the inner cavity surface of the tire located further inside the groove bottom inevitably increases. If the center position of the electronic component mounting member, which is also the center point of the joint surface, exists at a location where this deformation is large, as described above, the movement (deformation) due to rolling will be large, the cumulative number will be large, and the electronic component mounting member may peel off from the tire and come off.

Therefore, in the present disclosure, the electronic component mounting member is arranged so that the center position of the electronic component mounting member (the center point of the joint surface) is shifted from the groove, and it is thought that the transmission of the large deformation caused by the rolling to the electronic component mounting member can be suppressed.

Furthermore, the complex elastic modulus $E^*_r$ (MPa) of the joint portion at 30° C. and the complex elastic modulus $E^*_t$ (MPa) of the tread rubber constituting the tread portion at 30° C. satisfy $E^*_r/E^*_t<1$ (formula 1). That is, the electronic component mounting member is made softer than the rubber layer having the largest volume in the tread land portion, so that the deformation occurring in the tread portion can be flexibly followed.

The $E^*_r/E^*_t$ is preferably less than 0.95, more preferably less than 0.90, further preferably 0.80 or less, further preferably less than 0.80, and further preferably 0.67 or less. On the other hand, the lower limit is not particularly limited, but is preferably greater than 0.30, more preferably 0.40 or greater, further preferably greater than 0.40, further preferably greater than 0.50, and further preferably 0.60 or greater. This is because if the value is 0.30 or less, the vibration received from the land portion will cause the electronic component mounting member to vibrate too much, and it is thought the peeling resistant effect will decrease.

The complex elastic modulus $E^*_t$ of the tread rubber is preferably 6 MPa or higher, more preferably 8 MPa or higher, further preferably 8.5 MPa or higher, and further preferably 9 MPa or higher. This is because if it is less than 6 MPa, the deformation at the tread portion becomes too large, and the deformation transmitted to the electronic component mounting member becomes large.

On the other hand, it is preferably 15 MPa or less, more preferably 12 MPa or less, and further preferably 10 MPa or less. This is because when the it exceeds 15 MPa, the impact generated in the tread land portion is likely to be transmitted to the inside, the impact transmitted to the electronic component mounting member is also increased, and it is thought to reduce the peeling resistant performance.

The complex elastic modulus $E^*_r$ of the electronic component mounting member is preferably 2 MPa or more, more preferably 4 MPa or more, and further preferably 5 MPa or more. This is because when it is less than 2 MPa, the electronic component mounting member tends to vibrate due to the impact received, and it is thought to decrease the peeling resistant performance.

On the other hand, it is preferably 12 MPa or less, more preferably 10 MPa or less, and further preferably 8 MPa or less. It is considered that by setting the complex elastic modulus to 12 MPa or less, it becomes easier to follow the deformation transmitted from the tread portion, and the peeling resistance is improved.

As a result, even if the tread portion is deformed due to a large impact during high-speed running, it is possible to sufficiently suppress the peeling of the electronic component mounting member from the tire, and it is thought that excellent peeling resistance can be demonstrated.

3. Preferred Aspects of the Tire According to the Present Disclosure

The tire according to the present disclosure preferably adopts the following aspects.

(1) Loss Tangent of Tread Rubber

In the tire according to the present disclosure, the tread rubber preferably has a loss tangent at 0° C. (0° C. tan δ) of 0.30 or more.

The loss tangent tan δ is a parameter that indicates the energy absorption performance, and it is thought that the higher the value, the more energy can be absorbed. When the input frequency is high, it is considered that the loss tangent at a temperature lower than the actual temperature has an effect on the energy absorption performance. Therefore, by controlling the tan δ at 0° C. of the tread rubber (0° C. tan δ) to such a value, the energy applied to the tread portion, especially when impact is applied during high-speed running, can be absorbed and it is considered that the deformation transmitted to the member can be further reduced, and the peeling of the electronic component mounting member can be suppressed more sufficiently.

In addition, 0° C. tan δ is more preferably 0.33 or more, and further preferably 0.35 or more. The 0° C. tan δ is measured under conditions of measurement temperature of 0° C., initial strain of 10%, dynamic strain of ±2.5%, frequency of 10 Hz, and deformation mode: tension.

On the other hand, the loss tangent is also a parameter representing the heat-generating property of rubber, and there is concern that the temperature of the tread portion may rise due to deformation that occurs with the road surface during rolling. If the temperature of the tread portion rises excessively, the tread portion is likely to be deformed, and it is considered that the peeling resistance of the electronic component mounting member that is in contact with the inner cavity is reduced.

Considering this point, the loss tangent (30° C. tan δ) of the tread rubber at 30° C. is preferably 0.13 or less, more preferably 0.12 or less, further preferably 0.11 or less, and further preferably 0.1 or less. The 30° C. tan δ is measured under conditions of measurement temperature of 30° C., initial strain of 5%, dynamic strain of 1%, frequency of 10 Hz, and deformation mode: tension.

Each tan δ described above can be measured, for example, using a viscoelasticity measuring device such as "EPLEXOR (registered trademark)" manufactured by GABO.

(2) Relationship Between the Thickness of the Electronic Component Mounting Member and the Thickness of the Tread Rubber Layer In the present disclosure, the thickness $d_r$ (mm) of the electronic component mounting member and the thickness $d_t$ (mm) of the rubber layer of the tread portion outside the joint portion of the electronic component mounting member in the tire radial direction preferably satisfy $0.25<(d_r/d_t)<1.25$ (formula 2).

If the thickness $d_r$ of the electronic component mounting member is too large with respect to the thickness $d_t$ of the rubber layer of the tread portion, the vibration transmitted from the tread portion causes the electronic component mounting member to vibrate greatly on the side opposite to the joint portion, and it is considered that the peeling resistant effect is reduced. On the other hand, if the thickness $d_r$ of the electronic component mounting member is too small with respect to the thickness $d_t$ of the tread rubber, deformation of the tread portion will increase the strain applied to the electronic component mounting member, and it is considered that the peeling resistant effect is reduced.

In addition, $(d_r/d_t)$ is preferably 0.75 or more, more preferably 0.85 or more, and further preferably 0.90 or more. On the other hand, it is preferably 1.15 or less, more preferably 1.10 or less, further preferably 1.05 or less, and further preferably 1 or less.

The "thickness of the rubber layer of the tread portion" is the thickness of the entire tread rubber layer at the center of the land portion of the area where the electronic component mounting member is mounted. When the belt reinforcing layer, belt layer, etc. are provided, it is the thickness from the outermost surface of the tread to the outermost layer among them in the radial direction. The "thickness of the electronic component mounting member" is the total thickness of the electronic component mounting member.

(3) Relationship Between the Glass Transition Point of the Electronic Component Mounting Member and the Glass Transition Point of the Tread Rubber In the present disclosure, it is preferable that the glass transition point $Tg_r$ (° C.) of the electronic component mounting member and the glass transition point $Tg_t$ (° C.) of the tread rubber satisfy Tg t–Tg r>0 (formula 3).

It is known that physical properties such as hardness, rigidity and viscosity of rubbers and plastics change abruptly at the boundary of the glass transition point (Tg). At this point, the loss tangent of each rubber composition reaches a maximum value. Based on this knowledge, by increasing the glass transition point $Tg_t$ of the tread rubber than the glass transition point $Tg_r$ of the joint portion of the electronic component mounting member ($Tg_t-Tg_r>0$), it is thought that the tread portion tends to exhibit a higher loss tangent when an impact occurs, making it easier to absorb the impact in the tread rubber. At the same time, even in a low-temperature environment, the joint portion of the electronic component mounting members is softer than the tread rubber, and even if an impact is transmitted to the electronic component mounting member, the impact can be reduced inside the electronic component mounting member, so it is thought that peeling from the tire inner surface can be suppressed more reliably.

The $Tg_t-Tg_r$ is preferably 2° C. or higher, more preferably 4° C. or higher, and further preferably 5° C. or higher. The upper limit is not particularly limited, but is preferably 100° C. or lower, more preferably 70° C. or lower, further preferably 30° C. or lower, further preferably 20° C. or lower, further preferably 18° C. or lower, further preferably 17° C. or lower, and further preferably 16° C. or lower.

The glass transition point $Tg_t$ of the tread rubber is not particularly limited, but is preferably −50° C. or higher, more preferably −45° C. or higher, further preferably −40° C. or higher, and further preferably −35° C. or higher. This is because if the temperature is less than −50° C., mobility of the tread rubber becomes too high, and the amount of deformation when an impact is applied increases, resulting in a decrease in peeling resistance. On the other hand, the glass transition point is preferably 0° C. or lower, more preferably −10° C. or lower, further preferably −15° C. or lower, further preferably −17° C. or lower, further preferably −18° C. or lower, and further preferably −19° C. or lower. This is because when the temperature exceeds 0° C., the tread rubber has low motility even during normal running, and impact is likely to be transmitted to the inside, resulting in a decrease in peeling resistance.

The glass transition point $Tg_r$ of the joint portion of the electronic component mounting member is preferably −60° C. or higher, more preferably −55° C. or higher, further preferably −45° C. or higher, and further preferably −35° C. or higher. This is because if the temperature is lower than −60° C., the mobility of the joint becomes too high, and when an impact is transmitted, it is likely to resonate, resulting in a decrease in peeling resistance. On the other hand, the upper limit is preferably −10° C. or lower, more preferably −20° C. or lower, and further preferably −25° C. or lower. This is because when the temperature is −10° C. or higher, the inner motility becomes too low when an impact is applied, and it becomes impossible to follow the deformation of the tread portion, resulting in a decrease in peeling resistance.

[2] Specific Embodiment

Next, specific embodiments of the present disclosure will be described. In the following description, an electronic component mounting member made of rubber will be taken as an example of the electronic component mounting member. However, there is no particular limitation, and an electronic component mounting member made of plastic may be used as long as the relationship of the above-mentioned (formula 1) is satisfied.

1. Tire Configuration

FIG. 1 is a cross-sectional view showing the configuration of a tire according to one embodiment of the present disclosure. In FIG. 1, 1 is a tire, 2 is an electronic component mounting member, and 3 is a surface of a tread portion. In addition, 11 is a tread, 12 is a belt, 13 is a sidewall, 14 is a carcass layer, 15 is a bead core, 16 is a bead apex, 17 is a chafer, 18 is a clinch, 19 is a tire inner member (inner liner), and 31 is a circumferential groove. Further, I is a tire inner cavity surface, and CL is a center line in the width direction of the tire.

As shown in FIG. 1, the electronic component mounting member 2 is first placed on the tire inner cavity surface I, i.e. the surface of the inner liner 19. At this time, in order to soften the impact applied to the electronic component mounting member, it is arranged so that a line passing through the center point of the joint surface of the electronic component mounting member with the tire inner cavity surface and perpendicular to the surface profile of the tread portion does not pass through the circumferential grooves 31 formed on the surface 3 of the tread land portion. At this time, the deviation between the straight line passing through the center line of the joint surface of the electronic member mounting member and the center of the tread land portion is preferably within ±10 mm, more preferably within ±7 mm, further preferably within ±5 mm, and further preferably within ±2 mm. This is because, if it exceeds 10 mm, it is close to the tread land portion end, the impact transmitted from the tread portion becomes large, and it is considered to reduce the peeling resistance.

Here, the surface profile of the tread portion is the shape of surface formed by connecting the land surface forming the contact surface of the tread portion of a tire assembled to the "standardized rim", applying" standardized internal pressure" and applying no load. For example, it can be confirmed by fixing the bead part of a section cut out with a width of about 2 cm in the radial direction of the tire according to the applicable rim width and connecting the adjacent land portions virtually.

Then, by drawing a virtual line that passes through the center point of the joint surface of the electronic component mounting member with the tire inner cavity surface and is perpendicular to the surface profile of the tread portion obtained by the above method, it is possible to confirm that this virtual line does not pass through the circumferential groove formed in the tread, and it can be easily confirmed by fixing the bead portion of the section cut out with a width of about 2 cm according to the applicable rim width.

In addition, in order to obtain monitoring information with high accuracy and stability, it is preferable that the center of the electronic component mounting member is located in the central two areas closest to the tire equatorial plane among the four areas divided by the lines extending parallel to the radial direction of the lines dividing between both ground contact edges forming the tread contact width into four equal parts in the tire cross section. As an example, FIG. 1 shows an example in which the electronic component mounting member 2 is mounted on the central portion in the tire width direction of the inner cavity surface of the tire, that is, on the center line CL. Although not shown, electronic components are incorporated in the electronic component mounting member 2.

Figure 2:
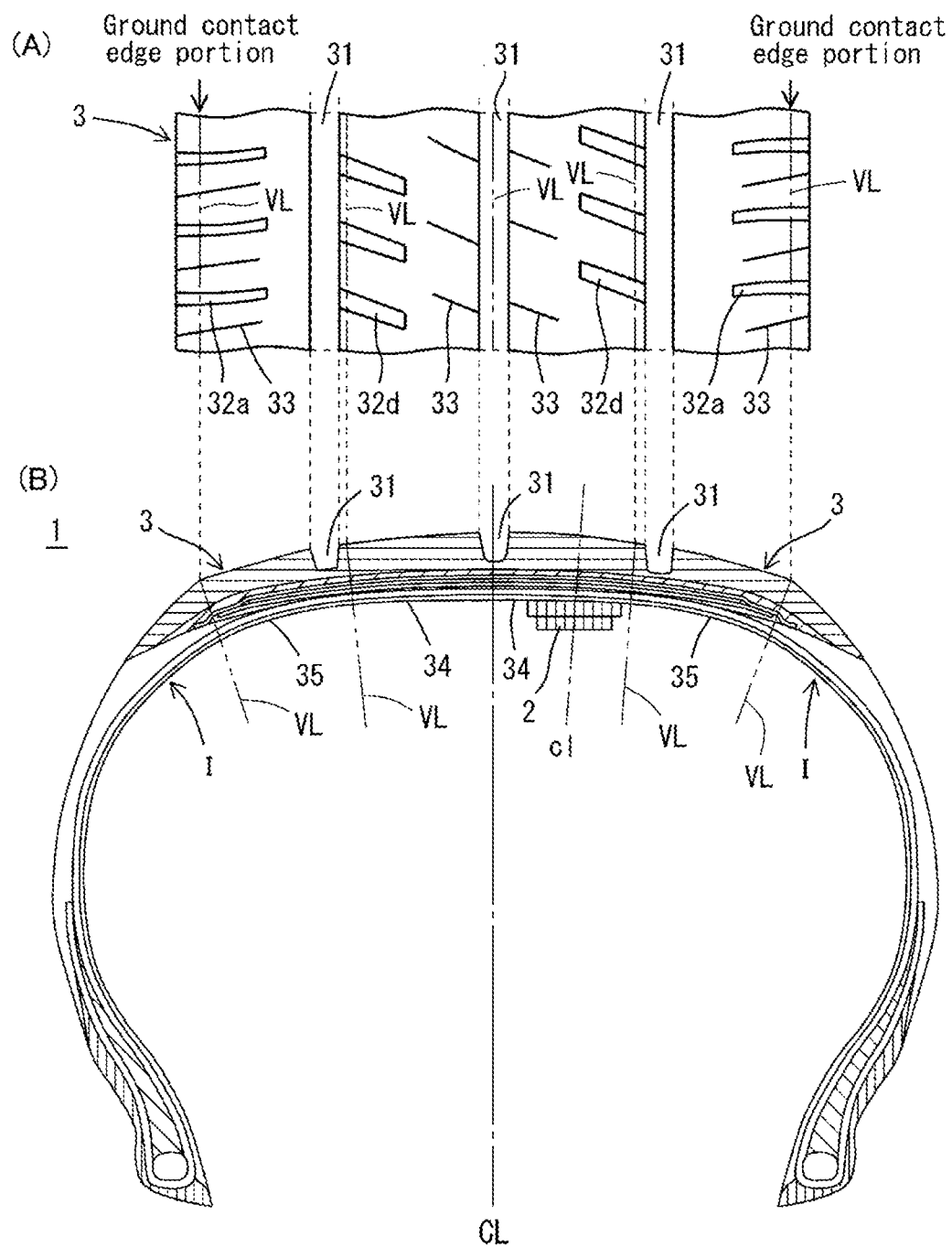
FIG. 2(A) is a diagram showing the shape of a tread surface of a tire according to another embodiment of the present disclosure, and (B) is a cross-sectional view showing a configuration of the tire according to another embodiment of the present disclosure.

FIG. 2 is a drawing of a tire according to another embodiment of the present disclosure, where (A) is a diagram showing the shape of the surface of the tread, and (B) is a cross-sectional view showing the structure of the tire. In FIG. 2(A), VL is a virtual line dividing between both ground contact edges forming the tread contact width. Further, in FIG. 2(B), cl is the center line of the electronic component mounting member 2. Areas 34 and 35 are areas divided into four equal parts by the virtual line VL, 34 is the area closest to the tire equatorial plane, and 35 is the outside area in the axial direction of the tire. In FIG. 2(A), 32d is a central lateral groove, and 32a is a lateral groove provided with a decorative groove at the outer end in the axial direction of the tire. Moreover, 33 is a sipe.

In the tire of this embodiment, one circumferential groove 31 is formed on the center line CL of the tire on the surface 3 of the tread portion, that is, on the equator, and one circumferential groove 31 is formed on each side thereof. In the tire in which the circumferential groove 31 is formed on the equator in this way, it is preferable to locate the center of the electronic component mounting member within the area 34, i.e. two center areas closest to the tire equatorial plane among the four areas divided by the virtual lines VL being both the ground contact edges and lines extending in parallel to the tire radial direction so that dividing between both the ground contact edges into four equal parts, specifically, among the four areas divided by the virtual lines VL extending from positions on the profile of the tire surface that divides between both ground contact edges into four equal parts and perpendicular to the profile.

Here, "both ground contact edges forming the tread contact width" means edges that forms the maximum linear distance in the tire axial direction at the contact surface with the flat plate when the tire is mounted on a "standardized rim", applied with "standardized internal pressure", and placed stationary on a flat plate in a vertical position, and then a "standardized load" is applied. Specifically, for example, it can be specified by applying a "standardized load" to the tire with ink on the tread surface, pressing it against the cardboard, and transferring the ink.

Further, it can be confirmed whether or not the electronic component mounting member is located in the central two areas closest to the tire equatorial plane among the four areas divided by dividing between both ground contact edges, mentioned above, into four equal parts by, for example, transcribing the ground-contact edge position on the cross section cut out by a width of about 2 cm and dividing the tire into quarters along the surface profile.

In addition, the "standardized rim" is a rim defined for each tire in the standard system including the standard on which the tire is based. For example, in the case of JATMA (Japan Automobile Tire Association), it is the standard rim in applicable sizes described in the "JATMA YEAR BOOK", in the case of "ETRTO (The European Tire and Rim Technical Organization)", it is "Measuring Rim" described in "STANDARDS MANUAL", and in the case of TRA (The Tire and Rim Association, Inc.), it is "Design Rim" described in "YEAR BOOK". In the case of tires that are not specified in the standard, it refers a rim that can be assembled and can maintain internal pressure, that is, the rim that does not cause air leakage from between the rim and the tire, and has the smallest rim diameter, and then the narrowest rim width.

The "standardized internal pressure" is the air pressure specified for each tire by the above standards, and is the maximum air pressure for JATMA, the maximum value described in the table "TIRE LOAD LIMITS AT VARIOUS COLD INFLATION PRESSURES" for TRA, and "INFLATION PRESSURE" for ETRTO. And, in the case of a tire that is not defined in the standard, it is set to 250 kPa.

"Standardized load" is the load defined for each tire by the above-mentioned standards, and refers to the maximum mass that can be loaded on the tire, and is the maximum load capacity for JATMA, the maximum value described in "TIRE LOAD LIMITS AT VARIOUS COLD INFLATION PRESSURES" for TRA, and "LOAD CAPACITY" for ETRTO.

In the case of tires not specified in the standard, the standardized load shall be calculated by the following formula.

$$\text{Standardized (kg)} = 0.000011 \times V + 175$$

$$V = \{(Dt/2)^2 - (Dt/2 - Ht)^2\} \times n \times Wt$$

Here, V is the occupied volume of the tire (mm³), Dt is the tire outer diameter (mm), Ht is the tire section height (mm), and Wt is the tire section width (mm). It is the value measured in the standardized state. Note that n is the circular constant.

In the above description, the outer diameter Dt of the tire is the outer diameter of the tire when the tire is mounted on a standardized rim, the internal pressure is set to 250 kPa and no load is applied. The tire cross-sectional height Ht is the distance from the bottom surface of the bead portion to the outermost surface of the tread of the tire, and is calculated as ½ of the difference between the outside diameter of the tire and the nominal diameter of the rim. The cross-sectional width Wt of the tire is the linear distance between the sidewalls including all the patterns and characters on the tire side surface (total width of the tire), excluding the patterns and letters on the side of the tire.

Next, the electronic component mounting member 2 has an electronic component storage portion for storing electronic components, and a joint portion having a joint surface for mounting the electronic component mounting member 2 on the surface of the inner liner 19.

FIG. 3(A) is a perspective view of the electronic component mounting member 2 according to the present embodiment as viewed from the side facing the joint surface, and FIG. 3(B) is a perspective view of the electronic component mounting member 2 as viewed from the joint surface side. Moreover, FIG. 4 is a perspective view of the electronic component mounting member 2 according to another embodiment, viewed from the side facing the joint surface.

Figure 3:
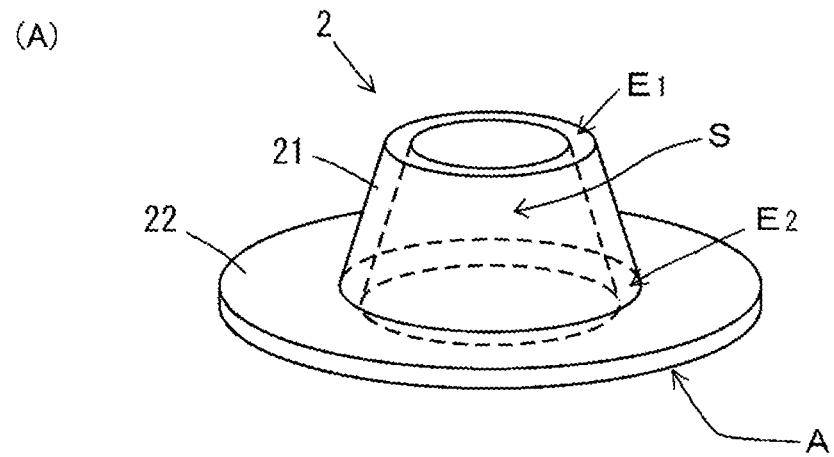
FIG. 3(A) is a perspective view of an electronic component mounting member according to an embodiment of the present disclosure as viewed from a side facing the joint surface, and (B) is a perspective view as viewed from the joint surface side.
Figure 3:
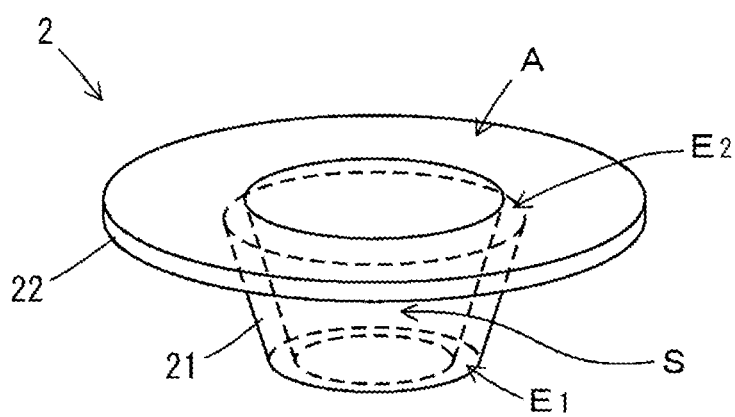
Figure 4:
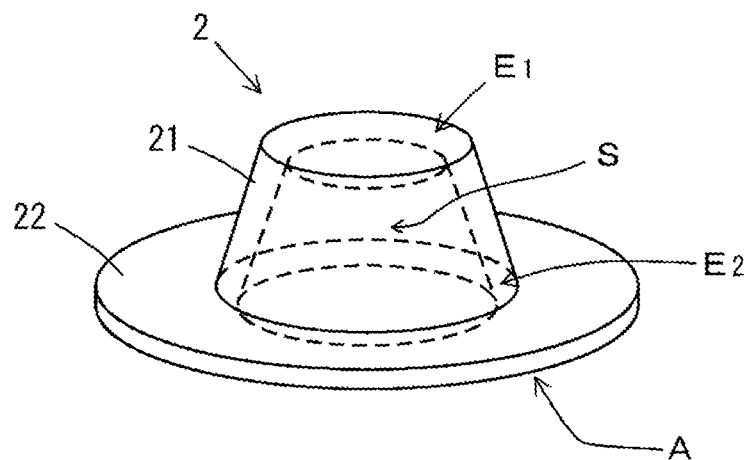
FIG. 4 is a perspective view of an electronic component mounting member according to another embodiment of the present disclosure, viewed from a side facing the joint surface.

In FIG. 3 and FIG. 4, 21 is an electronic component storage portion and 22 is a joint portion. A is a joint surface to be joined to the inner liner 19, $E_1$ is the upper end portion of the electronic component storage portion 21 facing the joint surface, and $E_2$ is the lower end of the electronic component storage portion on the joint surface side, and S is a storage space for electronic components.

As shown in FIG. 3 and FIG. 4, the electronic component storage portion 21 is formed in a cylindrical shape and has a storage space S for electronic components inside. A flange-shaped joint portion 22 is formed at the lower end portion $E_2$ of the electronic component storage portion 21, and a joint surface A is formed on the lower surface of the joint portion 22. By forming the joint portion 22 into a flange shape, the size of the joint surface A can be increased and a sufficient bonding area can be secured with the tire inner member, so that the joint strength can be further increased.

The cross-sectional shape, size and depth of the storage space S are appropriately determined according to the shape and size of the electronic components to be stored. As for the shape of the cross section, for example, in addition to the illustrated circular shape, an elliptical shape, a polygonal shape, or the like can be appropriately set. It is preferable that the side wall of the cylinder is formed in a truncated cone shape so that the size of the cross section of the storage space S is large on the lower end $E_2$ side and smaller on the upper end $E_1$ side, and not perpendicular to the joint portion 22.

The lower end $E_2$ side of the electronic component storage part 21 is preferably formed to be open, so that, for example, the sensor can be brought into direct contact with the inner tire member of the tire, and accurate information can be obtained with higher sensitivity. On the other hand, when the upper end $E_1$ side is open as shown in FIG. 3(A), electronic components can be detachably mounted and easily replaced. As shown in FIG. 4, the upper end $E_1$ side may be closed. In this case, the electronic components can be hermetically stored in the storage space S and placed in a stable environment.

Although the diameter of the storage space S at the lower end $E_2$ is not particularly limited, it is preferably 50 mm or less, more preferably 40 mm or less, and further preferably 25 mm or less. This is because if the diameter exceeds 50 mm, the lower end portion of the storage space S is likely to be deformed by the circumferential groove portion of the tread portion, and it is thought peeling resistance decreases.

Although the diameter is not particularly limited, it is preferably 10 mm or more, more preferably 15 mm or more. Further, the combined weight of the electronic component and the electronic component mounting member is, for example, preferably 15 g or more, more preferably 20 g or more. On the other hand, it is preferably 500 g or less, more preferably 250 g or less, further preferably 100 g or less. This is because if the weight exceeds 500 g, the kinetic energy of the electronic component and the electronic component mounting member increases, the impact transmitted through the tread portion during rolling increases, and it is thought the peeling resistance decreases.

2. Tread Rubber

In the present embodiment, the tread rubber can be obtained by extruding a rubber composition (tread rubber composition) prepared by kneading each compounding material described below into a predetermined shape.

(1) Tread Rubber Composition

In the present embodiment, the tread rubber composition contains various compounding materials such as rubber components, fillers, softeners, vulcanizing agents, and vulcanization accelerators described below, and can be obtained by appropriately adjusting the types and amounts of the compounding materials, particularly fillers and softeners.

(a) Rubber Component

In the present embodiment, as the rubber component, a rubber (polymer) generally used for manufacturing tires such as butadiene rubber (BR), styrene-butadiene rubber (SBR), isoprene-based rubber, and nitrile rubber (NBR) is used. Among these, it is preferable to contain styrene-butadiene rubber (SBR), isoprene-based rubber and styrene-butadiene rubber (SBR). These rubbers may be used singly or in combination. From the viewpoint of preventing the propagation of impact by separating each rubber phase and making it entangled with each other, it is preferable to use two types of rubber together, such as an isoprene-based rubber and BR, BR and SBR, or an isoprene-based rubber and SBR, or a combination of three types of rubber, isoprene rubber, BR and SBR.

(a-1) SBR

The SBR content in 100 parts by mass of the rubber component is, for example, preferably more than 20 parts by mass, more preferably more than 30 parts by mass, and further preferably more than 40 parts by mass. On the other hand, it is preferably less than 100 parts by mass, more preferably less than 70 parts by mass, and further preferably less than 60 parts by mass.

The weight average molecular weight of SBR is, for example, more than 100,000 and less than 2,000,000. The styrene content of SBR is, for example, preferably more than 5% by mass, more preferably more than 10% by mass, and further preferably more than 20% by mass. On the other hand, it is preferably less than 50% by mass, more preferably less than 40% by mass, and further preferably less than 35% by mass. The vinyl bond content (1,2-bonded butadiene unit content) of SBR is, for example, more than 5% by mass and less than 70% by mass. The structural identification of SBR (measurement of styrene content and vinyl bond content) can be performed using, for example, JNM-ECA series equipment manufactured by JEOL Ltd.

The SBR is not particularly limited, and, for example, emulsion-polymerized styrene-butadiene rubber (E-SBR), solution-polymerized styrene-butadiene rubber (S-SBR), etc. can be used. SBR may be either unmodified SBR or modified SBR.

The modified SBR may be any SBR having a functional group that interacts with a filler such as silica. Examples thereof include end-modified SBR (end-modified SBR having the above functional group at the terminal) in which at least one end of the SBR is modified with a compound having the above functional group (modifying agent), main chain modified SBR having the functional group in the main chain, main chain terminal modified SBR having the functional group at the main chain and the terminal (for example, a main chain terminal modified SBR having the above functional group to the main chain and having at least one end modified with the above modifying agent), and end-modified SBR which is modified (coupled) with a polyfunctional compound having two or more epoxy groups in the molecule, and into which an epoxy group or hydroxyl group has been introduced.

Examples of the functional group include an amino group, an amide group, a silyl group, an alkoxysilyl group, an isocyanate group, an imino group, an imidazole group, a urea group, an ether group, a carbonyl group, an oxycarbonyl group, a mercapto group, a sulfide group, a disulfide group, a sulfonyl group, a sulfinyl group, a thiocarbonyl group, an ammonium group, an imide group, a hydrazo group, an azo group, a diazo group, a carboxyl group, a nitrile group, a pyridyl group, an alkoxy group, a hydroxyl group, an oxy group, and an epoxy group. In addition, these functional groups may have a substituent.

Further, as the modified SBR, for example, an SBR modified with a compound (modifying agent) represented by the following formula can be used.

[Chemical 1]

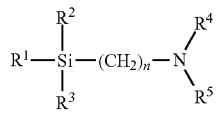

In the formula, $R^1$, $R^2$ and $R^3$ are the same or different and represent alkyl group, alkoxy group, silyloxy group, acetal group, carboxyl group (—COOH), mercapto group (—SH) or derivatives thereof. $R^4$ and $R^5$ are the same or different and represent hydrogen atoms or alkyl group. $R^4$ and $R^5$ may be combined to form a ring structure with nitrogen atoms. n represents an integer.

As the modified SBR modified by the compound (modifying agent) represented by the above formula, SBR, in which the polymerization end (active end) of the solution-polymerized styrene-butadiene rubber (S-SBR) is modified by the compound represented by the above formula (for example, modified SBR described in JP-A-2010-111753), can be used.

As $R^1$, $R^2$ and $R^3$, an alkoxy group is suitable (preferably an alkoxy group having 1 to 8 carbon atoms, more preferably an alkoxy group having 1 to 4 carbon atoms). As $R^4$ and $R^5$, an alkyl group (preferably an alkyl group having 1 to 3 carbon atoms) is suitable. n is preferably 1 to 5, more preferably 2 to 4, and even more preferably 3. Further, when $R^4$ and $R^5$ are combined to form a ring structure together with a nitrogen atom, a 4- to 8-membered ring is preferable. The alkoxy group also includes a cycloalkoxy group (cyclohexyloxy group, and the like) and an aryloxy group (phenoxy group, benzyloxy group, and the like).

Specific examples of the above modifying agent include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, and 3-diethylaminopropyltriethoxysilane. These may be used alone or in combination of two or more.

Further, as the modified SBR, a modified SBR modified with the following compound (modifying agent) can also be used. Examples of the modifying agent include polyglycidyl ethers of polyhydric alcohols such as ethylene glycol diglycidyl ether, glycerin triglycidyl ether, trimethylolethanetriglycidyl ether, and trimethylolpropane triglycidyl ether;

polyglycidyl ethers of aromatic compounds having two or more phenol groups such as diglycidylated bisphenol A;

polyepoxy compounds such as 1,4-diglycidylbenzene, 1,3,5-triglycidylbenzene, and polyepoxidized liquid polybutadiene;

epoxy group-containing tertiary amines such as 4,4'-diglycidyl-diphenylmethylamine, and 4,4'-diglycidyl-dibenzylmethylamine;

diglycidylamino compounds such as diglycidylaniline, N, N'-diglycidyl-4-glycidyloxyaniline, diglycidyl orthotoluidine, tetraglycidylmetaxylenidiamine, tetraglycidylaminodiphenylmethane, tetraglycidyl-p-phenylenediamine, diglycidylaminomethylcyclohexane, and tetraglycidyl-1,3-bisaminomethylcyclohexane;

amino group-containing acid chlorides such as bis-(1-methylpropyl) carbamate chloride, 4-morpholincarbonyl chloride, 1-pyrrolidincarbonyl chloride, N, N-dimethylcarbamide acid chloride, and N, N-diethylcarbamide acid chloride;

epoxy group-containing silane compounds such as 1,3-bis-(glycidyloxypropyl)-tetramethyldisiloxane, and (3-glycidyloxypropyl)-pentamethyldisiloxane;

sulfide group-containing silane compound such as (trimethylsilyl) [3-(trimethoxysilyl) propyl] sulfide, (trimethylsilyl) [3-(triethoxysilyl) propyl]sulfide, (trimethylsilyl) [3-(tripropoxysilyl) propyl] sulfide, (trimethylsilyl) [3-(tributoxysilyl) propyl] sulfide, (trimethylsilyl) [3-(methyldimethoxysilyl) propyl] sulfide, (trimethylsilyl) [3-(methyldiethoxysilyl) propyl] sulfide, (trimethylsilyl) [3-(methyldipropoxysilyl) propyl] sulfide, and (trimethylsilyl) [3-(methyldibutoxysilyl) propyl] sulfide;

N-substituted aziridine compound such as ethyleneimine and propyleneimine;

alkoxysilanes such as methyltriethoxysilane, N, N-bis (trimethylsilyl)-3-aminopropyltrimethoxysilane, N, N-bis (trimethylsilyl)-3-aminopropyltriethoxysilane, N, N-bis (trimethylsilyl) aminoethyltrimethoxysilane, and N, N-bis (trimethylsilyl) aminoethyltriethoxysilane;

(thio) benzophenone compound having an amino group and/or a substituted amino group such as 4-N, N-dimethylaminobenzophenone, 4-N, N-di-t-butylaminobenzophenone, 4-N, N-diphenylamino benzophenone, 4,4'-bis (dimethylamino) benzophenone, 4,4'-bis (diethylamino) benzophenone, 4,4'-bis (diphenylamino) benzophenone, and N, N, N', N'-bis-(tetraethylamino) benzophenone;

benzaldehyde compounds having an amino group and/or a substituted amino group such as 4-N, N-dimethylaminobenzaldehyde, 4-N, N-diphenylaminobenzaldehyde, and 4-N, N-divinylamino benzaldehyde;

N-substituted pyrrolidone such as N-methyl-2-pyrrolidone, N-vinyl-2-pyrrolidone, N-phenyl-2-pyrrolidone, N-t-butyl-2-pyrrolidone, and N-methyl-5-methyl-2-pyrrolidone;

N-substituted piperidone such as methyl-2-piperidone, N-vinyl-2-piperidone, and N-phenyl-2-piperidone;

N-substituted lactams such as N-methyl-ε-caprolactam, N-phenyl-ε-caprolactum, N-methyl-ω-laurilolactum, N-vinyl-ω-laurilolactum, N-methyl-β-propiolactam, and N-phenyl-β-propiolactam; and N, N-bis-(2,3-epoxypropoxy)-aniline, 4,4-methylene-bis-(N, N-glycidylaniline), tris-(2,3-epoxypropyl)-1,3,5-triazine-2,4,6-triones, N, N-diethylacetamide, N-methylmaleimide, N, N-diethylurea, 1,3-dimethylethylene urea, 1,3-divinylethyleneurea, 1,3-diethyl-2-imidazolidinone, 1-methyl-3-ethyl-2-imidazolidinone, 4-N, N-dimethylaminoacetophenone, 4-N, N-diethylaminoacetophenone, 1,3-bis (diphenylamino)-2-propanone, and 1,7-bis(methylethylamino)-4-heptanone. The modification with the above compound (modifying agent) can be carried out by a known method.

As the SBR, for example, SBR manufactured and sold by Sumitomo Chemical Co., Ltd., JSR Corporation, Asahi Kasei Co., Ltd., Nippon Zeon Co., Ltd, etc. can be used. The SBR may be used alone or in combination of two or more.

(a-2) BR

The tread rubber composition may further contain BR, if desired. In this case, the content of BR in 100 parts by mass of the rubber component is, for example, preferably more than 10 parts by mass, more preferably more than 20 parts by mass, and further preferably more than 30 parts by mass. On the other hand, it is preferably less than 70 parts by mass, more preferably less than 60 parts by mass, and further preferably less than 50 parts by mass.

The weight average molecular weight of BR is, for example, more than 100,000 and less than 2,000,000. The vinyl bond content of BR is, for example, more than 1% by mass and less than 30% by mass. The cis amount of BR is, for example, more than 1% by mass and less than 98% by mass. The trans amount of BR is, for example, more than 1% by mass and less than 60% by mass.

BR is not particularly limited, and BR with high cis content (90% or more of cis content), BR with low cis content, BR containing syndiotactic polybutadiene crystals, and the like can be used. BR may be either non-modified BR or modified BR, and modified BR includes modified BR into which the above-mentioned functional groups have been introduced. These may be used alone or in combination of two or more. The cis content can be measured by infrared absorption spectrometry.

As BR, for example, products of Ube Industries, Ltd., JSR Corporation, Asahi Kasei Co., Ltd., Nippon Zeon Co., Ltd., etc. can be used.

(a-3) Isoprene Rubber

The tread rubber composition may further contain an isoprene-based rubber, if necessary. In this case, the content of the isoprene-based rubber in 100 parts by mass of the rubber component is preferably more than 5 parts by mass and less than 20 parts by mass, for example.

The isoprene rubber includes natural rubber (NR), isoprene rubber (IR), reformed NR, modified NR, modified IR, and the like.

As NR, for example, those commonly used in the tire industry, such as SIR20, RSS #3, and TSR20, can be used. The IR is not particularly limited, and those commonly used in the tire industry, such as IR2200, can be used. Reformed NR includes deproteinized natural rubber (DPNR), high-purity natural rubber (UPNR), and the like. Modified NR includes epoxidized natural rubber (ENR), hydrogenated natural rubber (HNR), grafted natural rubber, and the like. Modified IR include epoxidized isoprene rubber, hydrogenated isoprene rubber, grafted isoprene rubber, and the like. These may be used alone or in combination of two or more.

(a-4) Other Rubber Components

The rubber composition may also contain, as other rubber components, rubbers (polymers) generally used for manufacturing tires, such as nitrile rubber (NBR).

(b) Compounding Materials Other than Rubber Components (b-1) Filler

In the present embodiment, the rubber composition preferably contains a filler. Specific examples of the fillers include silica, carbon black, calcium carbonate, talc, alumina, clay, aluminum hydroxide, and mica. Among these, silica and carbon black are preferably used as reinforcing agents. When using silica, it is preferable to use together with a silane coupling agent.

(b-1-1) Silica

The rubber composition preferably contains silica. The BET specific surface area of the silica is preferably more than 140 $m^2/g$, more preferably more than 160 $m^2/g$, from the viewpoint of obtaining good durability performance. On the other hand, it is preferably less than 250 $m^2/g$, more preferably less than 220 $m^2/g$, from the viewpoint of obtaining good rolling resistance during high-speed running. The BET specific surface area mentioned above is the value of $N_2SA$ measured by the BET method according to ASTM D3037-93.

When silica is used as the filling reinforcing agent, the content of silica with respect to 100 parts by mass of the rubber component is preferably more than 35 parts by mass, more preferably more than 40 parts by mass, from the viewpoint of obtaining good durability performance. On the other hand, from the viewpoint of obtaining good rolling resistance during high-speed running, it is preferably less than 150 parts by mass, more preferably less than 70 parts by mass, further preferably less than 65 parts by mass and further preferably less than 60 parts by mass.

Examples of silica include dry silica (anhydrous silica) and wet silica (hydrous silica). Among them, wet silica is preferable because it has large number of silanol groups.

As the silica, for example, products of Degussa, Rhodia, Tosoh Silica Co., Ltd., Solvay Japan Co., Ltd., Tokuyama Corporation, etc. can be used.

(b-1-2) Silane Coupling Agent

The rubber composition preferably contains a silane coupling agent together with silica. The silane coupling agent is not particularly limited. Examples of the silane coupling agent include sulfide-based ones such as bis(3-triethoxysilylpropyl)tetrasulfide, bis (2-triethoxysilylethyl)tetrasulfide, bis (4-triethoxysilylbutyl)tetrasulfide, bis(3-trimethoxysilylpropyl) tetrasulfide, bis(2-trimethoxysilylethyl) tetrasulfide, bis(2-triethoxysilylethyl)trisulfide, bis(4-trimethoxysilylbutyl) trisulfide, bis(3-triethoxysilylpropyl)disulfide, bis(2-triethoxysilylethyl) disulfide, bis(4-triethoxysilylbutyl)disulfide, bis(3-trimethoxysilylpropyl) disulfide, bis(2-trimethoxysilylethyl)disulfide, bis(4-trimethoxysilylbutyl)disulfide, 3-trimethoxysilylpropyl-N, N-dimethylthiocarbamoyltetrasulfide, 2-triethoxysilylethyl-N, N-dimethylthiocarbamoyltetrasulfide, and 3-triethoxysilylpropylmethacrylate-monosulfide;

mercapto-based ones such as 3-mercaptopropyltrimethoxysilane, 2-mercaptoethyltriethoxysilane, and NXT and NXT-Z manufactured by Momentive;

vinyl-based ones such as vinyl triethoxysilane, and vinyl trimethoxysilane;

amino-based ones such as 3-aminopropyltriethoxysilane and 3-aminopropyltrimethoxysilane;

glycidoxy-based ones such as γ-glycidoxypropyltriethoxysilane and γ-glycidoxypropyltrimethoxysilane;

nitro-based ones such as 3-nitropropyltrimethoxysilane, and 3-nitropropyltriethoxysilane; and chloro-based ones such as 3-chloropropyltrimethoxysilane and 3-chloropropyltriethoxysilane. These may be used alone or in combination of two or more.

As the silane coupling agent, for example, products of Degussa, Momentive, Shinetsu Silicone Co., Ltd., Tokyo Chemical Industry Co., Ltd., Azumax Co., Ltd., Toray Dow Corning Co., Ltd., etc. can be used.

The content of the silane coupling agent is, for example, more than 3 parts by mass and less than 25 parts by mass.

(b-1-3) Carbon Black

The rubber composition preferably contains carbon black. The content of carbon black is preferably, for example, more than 1 part by mass, more preferably more than 3 parts by mass, with respect to 100 parts by mass of the rubber component. On the other hand, the upper limit is preferably less than 50 parts by mass, more preferably less than 20 parts by mass, further preferably less than 10 parts by mass, and particularly preferably less than 6 parts by mass.

Carbon black is not particularly limited, furnace black (furnace carbon black) such as SAF, ISAF, HAF, MAF, FEF, SRF, GPF, APF, FF, CF, SCF and ECF; acetylene black (acetylene carbon black) thermal blacks (thermal carbon blacks) such as FT and MT; channel blacks (channel carbon blacks) such as EPC, MPC and CC; graphite and the like. These may be used individually by 1 type, and may use 2 or more types together.

The nitrogen adsorption specific surface area ($N_2SA$) of carbon black is, for example, more than 30 $m^2/g$ and less than 250 $m^2/g$. The amount of dibutyl phthalate (DBP) absorbed by carbon black is, for example, more than 50 ml/100 g and less than 250 ml/100 g. The nitrogen adsorption specific surface area of carbon black is measured according to ASTM D4820-93, and the amount of DBP absorbed is measured according to ASTM D2414-93.

The specific carbon black is not particularly limited, and examples thereof include N134, N110, N220, N234, N219, N339, N330, N326, N351, N550, and N762. Commercially available products include, for example, products of Asahi Carbon Co., Ltd., Cabot Japan Co., Ltd., Tokai Carbon Co., Ltd., Mitsubishi Chemical Corporation, Lion Corporation, Shin Nikka Carbon Co., Ltd., Columbia Carbon Co., Ltd., etc. These may be used alone or in combination of two or more.

(b-1-4) Other Fillers

In addition to the carbon black and silica described above, the rubber composition further contains fillers commonly used in the tire industry, such as calcium carbonate, talc, alumina, clay, aluminum hydroxide, and mica. The contents thereof are, for example, more than 0.1 parts by mass and less than 200 parts by mass with respect to 100 parts by mass of the rubber component.

(b-2) Softener

The rubber composition may contain oils (including extender oils), liquid rubbers, resin components, and the like, as softeners. The total content of these is preferably more than 5 parts by mass and less than 35 parts by mass, more preferably less than 30 parts by mass and less than 25 parts by mass, further preferably less than 20 parts by mass, and 15 parts by mass with respect to 100 parts by mass of the rubber component. The content of oil also includes the amount of oil contained in the rubber (oil-extended rubber).

(b-2-1) Oil

Examples of oils include mineral oils (commonly referred to as process oils), vegetable oils, or mixtures thereof. As the mineral oil (process oil), for example, paraffinic process oil, aromatic process oil, naphthenic process oil and the like can be used. Vegetable oils include castor oil, cottonseed oil, linseed oil, rapeseed oil, soybean oil, palm oil, coconut oil, peanut oil, rosin, pine oil, pine tar, tall oil, corn oil, rice bran oil, safflower oil, sesame oil, olive oil, sunflower oil, palm kernel oil, camellia oil, jojoba oil, macadamia nut oil, tung oil and the like. These may be used alone or in combination of two or more.

As the specific process oils (mineral oils), products of Idemitsu Kosan Co., Ltd., Sankyo Yuka Kogyo Co., Ltd., Japan Energy Co., Ltd., Olisoy Co., Ltd., H & R Co., Ltd., Toyokuni Seiyu Co., Ltd., Showa Shell Sekiyu Co., Ltd., and Fuji Kosan Co., Ltd., etc. can be used.

(b-2-2) Liquid Rubber

The liquid rubber mentioned as the softener is a polymer in a liquid state at room temperature (25° C.) and is a polymer having a monomer similar to that of solid rubber as a constituent element. Examples of the liquid rubber include farnesene-based polymers, liquid diene-based polymers, and hydrogenated additives thereof.

The farnesene-based polymer is a polymer obtained by polymerizing farnesene, and has a structural unit based on farnesene. Farnesene includes isomers such as a-farnesene ((3E, 7E)-3,7,11-trimethyl-1,3,6,10-dodecatetraene) and B-farnesene (7,11-dimethyl-3-methylene-1, 6,10-dodecatorien).

The farnesene-based polymer may be a homopolymer of farnesene (farnesene homopolymer) or a copolymer of farnesene and a vinyl monomer (farnesene-vinyl monomer copolymer).

Examples of the liquid diene polymer include a liquid styrene-butadiene copolymer (liquid SBR), a liquid butadiene polymer (liquid BR), a liquid isoprene polymer (liquid IR), and a liquid styrene isoprene copolymer (liquid SIR).

The liquid diene polymer has a polystyrene-equivalent weight average molecular weight (Mw) measured by gel permeation chromatography (GPC) of, for example, more than $1.0 \times 10^3$ and less than $2.0 \times 10^5$. In the present specification, Mw of the liquid diene polymer is a polystyrene conversion value measured by gel permeation chromatography (GPC).

The content of the liquid rubber (total content of the liquid farnesene-based polymer, the liquid diene-based polymer, etc.) is, for example, more than 1 part by mass and less than 100 parts by mass with respect to 100 parts by mass of the rubber component.

As the liquid rubber, for example, products of Kuraray Co., Ltd. and Clay Valley Co., Ltd. can be used.

((b-2-3) Resin Component

Further, the rubber composition preferably contains a resin component, if necessary. The resin component may be solid or liquid at room temperature, and specific resin components include styrene resin, coumarone resin, terpene resin, C5 resin, C9 resin, C5C9 resin, acrylic resin, and the like. Two or more kinds of the resin component may be used in combination. The content of the resin component is preferably more than 2 parts by mass and less than 45 parts by mass, and more preferably less than 30 parts by mass, with respect to 100 parts by mass of the rubber component.

The styrene-based resin is a polymer using a styrene monomer as a constituent monomer, and examples thereof include a polymer obtained by polymerizing a styrene monomer as a main component (50% by mass or more). Specifically, it includes homopolymers obtained by individually polymerizing styrene monomers (styrene, o-methylstyrene, m-methylstyrene, p-methylstyrene, a-methylstyrene, p-methoxystyrene, p-tert-butylstyrene, p-phenylstyrene, o-chlorostyrene, m-chlorostyrene, p-chlorostyrene, etc.), copolymers obtained by copolymerizing two or more styrene monomers, and, in addition, copolymers obtained by copolymerizing a styrene monomer and other monomers that can be copolymerized with the styrene monomer.

Examples of the other monomers include acrylonitriles such as acrylonitrile and methacrylate; unsaturated carboxylic acids such as acrylic acid and methacrylic acid; unsaturated carboxylic acid esters such as methyl acrylate and methyl methacrylate; dienes such as chloroprene, butadiene, and isoprene; olefins such as 1-butene and 1-pentene; $\alpha,\beta$-unsaturated carboxylic acids such as maleic anhydride and acid anhydrides thereof.

As the coumarone-based resin, coumarone-indene resin is preferably used. Coumarone-indene resin is a resin containing coumarone and indene as monomer components constituting the skeleton (main chain) of the resin. Examples of the monomer component contained in the skeleton other than coumarone and indene include styrene, a-methylstyrene, methylindene, and vinyltoluene.

The content of the coumarone-indene resin is, for example, more than 1.0 part by mass and less than 50.0 parts by mass with respect to 100 parts by mass of the rubber component.

The hydroxyl value (OH value) of the coumarone-indene resin is, for example, more than 15 mgKOH/g and less than 150 mgKOH/g. The OH value is the amount of potassium hydroxide required to neutralize acetic acid bonded to a hydroxyl group when 1 g of the resin is acetylated, and is expressed in milligrams. It is a value measured by potentiometric titration method (JIS K 0070: 1992).

The softening point of the coumarone-indene resin is, for example, higher than 30° C. and lower than 160° C. The softening point is the temperature at which the ball drops when the softening point defined in JIS K 6220-1: 2001 is measured by a ring-ball type softening point measuring device.

Examples of the terpene resins include polyterpenes, terpene phenols, and aromatic-modified terpene resins. Polyterpene is a resin obtained by polymerizing a terpene compound and a hydrogenated product thereof. The terpene compound is a hydrocarbon having a composition of $(C_5H_8)_n$ or an oxygen-containing derivative thereof, which is a compound having a terpene classified as monoterpenes $(C_{10}H_{16})$, sesquiterpenes $(C_{15}H_{24})$, diterpenes $(C_{20}H_{32})$, etc. as the basic skeleton. Examples thereof include $\alpha$-pinene, $\beta$-pinene, dipentene, limonene, myrcene, alloocimene, osimene, $\alpha$-phellandrene, $\alpha$-terpinene, $\gamma$-terpinene, terpinolene, 1,8-cineol, 1,4-cineol, $\alpha$-terpineol, $\beta$-terpineol, and $\gamma$-terpineol.

Examples of the polyterpene include terpene resins such as $\alpha$-pinene resin, $\beta$-pinene resin, limonene resin, dipentene resin, and $\beta$-pinene/limonene resin, which are made from the above-mentioned terpene compound, as well as hydrogenated terpene resin obtained by hydrogenating the terpene resin. Examples of the terpene phenol include a resin obtained by copolymerizing the above-mentioned terpene compound and the phenol compound, and a resin obtained by hydrogenating above-mentioned resin. Specifically, a resin obtained by condensing the above-mentioned terpene compound, the phenol compound and the formalin can be mentioned. Examples of the phenol compound include phenol, bisphenol A, cresol, and xylenol. Examples of the aromatic-modified terpene resin include a resin obtained by modifying a terpene resin with an aromatic compound, and a resin obtained by hydrogenating above-mentioned resin. The aromatic compound is not particularly limited as long as it is a compound having an aromatic ring, and examples thereof include phenol compounds such as phenol, alkylphenol, alkoxyphenol, and unsaturated hydrocarbon group-containing phenol; naphthol compounds such as naphthol, alkylnaphthol, alkoxynaphthol, and unsaturated hydrocarbon group-containing naphthols; styrene derivatives such as styrene, alkylstyrene, alkoxystyrene, unsaturated hydrocarbon group-containing styrene; coumarone, and indene.

The "C5 resin" refers to a resin obtained by polymerizing a C5 fraction. Examples of the C5 fraction include petroleum fractions having 4 to 5 carbon atoms such as cyclopentadiene, pentene, pentadiene, and isoprene. As the C5-based petroleum resin, a dicyclopentadiene resin (DCPD resin) is preferably used.

The "C9 resin" refers to a resin obtained by polymerizing a C9 fraction, and may be hydrogenated or modified. Examples of the C9 fraction include petroleum fractions having 8 to 10 carbon atoms such as vinyltoluene, alkylstyrene, indene, and methyl indene. As the specific examples, a coumarone-indene resin, a coumarone resin, an indene resin, and an aromatic vinyl resin are preferably used. As the aromatic vinyl resin, a homopolymer of $\alpha$-methylstyrene or styrene or a copolymer of $\alpha$-methylstyrene and styrene is preferable because it is economical, easy to process, and excellent in heat generation. A copolymer of $\alpha$-methylstyrene and styrene is more preferred. As the aromatic vinyl-based resin, for example, those commercially available from Clayton, Eastman Chemical, etc. can be used.

The "C5C9 resin" refers to a resin obtained by copolymerizing the C5 fraction and the C9 fraction, and may be hydrogenated or modified. Examples of the C5 fraction and the C9 fraction include the above-mentioned petroleum fraction. As the C5C9 resin, for example, those commercially available from Tosoh Corporation, LUHUA, etc. can be used.

The acrylic resin is not particularly limited, but for example, a solvent-free acrylic resin can be used.

As the solvent-free acrylic resin, a (meth) acrylic resin (polymer) synthesized by a high-temperature continuous polymerization method (high-temperature continuous lump polymerization method: a method described in U.S. Pat. No. 4,414,370 B, JP 84-6207 A, JP 93-58805 A, JP 89-313522 A, U.S. Pat. No. 5,010,166 B, Toa Synthetic Research Annual Report TREND2000 No. 3 p 42-45, and the like) without using polymerization initiators, chain transfer agents, organic solvents, etc. as auxiliary raw materials as much as possible, can be mentioned. In the present disclosure, (meth) acrylic means methacrylic and acrylic.

Examples of the monomer component constituting the acrylic resin include (meth) acrylic acid, and (meth) acrylic acid derivatives such as (meth) acrylic acid ester (alkyl ester, aryl ester, aralkyl ester, etc.), (meth) acrylamide, and (meth) acrylamide derivative.

In addition, as the monomer component constituting the acrylic resin, aromatic vinyl compounds such as styrene, α-methylstyrene, vinyltoluene, vinylnaphthalene, divinylbenzene, trivinylbenzene, divinylnaphthalene, and the like may be used, together with (meth) acrylic acid or (meth) acrylic acid derivative.

The acrylic resin may be a resin composed of only a (meth) acrylic component or a resin also having a component other than the (meth) acrylic component. Further, the acrylic resin may have a hydroxyl group, a carboxyl group, a silanol group, or the like.

As the resin component, for example, a product of Maruzen Petrochemical Co., Ltd., Sumitomo Bakelite Co., Ltd., Yasuhara Chemical Co., Ltd., Toso Co., Ltd., Rutgers Chemicals Co., Ltd., BASF Co., Ltd., Arizona Chemical Co., Ltd., Nitto Chemical Co., Ltd., Co., Ltd., Nippon Catalyst Co., Ltd., JX Energy Co., Ltd., Arakawa Chemical Industry Co., Ltd., Taoka Chemical Industry Co., Ltd., etc. can be used.

(b-3) Anti-Aging Agent

The rubber composition preferably contains an anti-aging agent. Content of the anti-aging agent is, for example, more than 1 part by mass and less than 10 parts by mass with respect to 100 parts by mass of the rubber component.

Examples of the antiaging agent include naphthylamine-based antiaging agents such as phenyl-a-naphthylamine; diphenylamine-based antiaging agents such as octylated diphenylamine and 4,4'-bis (α, α'-dimethylbenzyl) diphenylamine; p-phenylenediamine-based anti-aging agent such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline-based anti-aging agent such as a polymer of 2,2,4-trimethyl-1,2-dihydroquinolin; monophenolic anti-aging agents such as 2,6-di-t-butyl-4-methylphenol, styrenated phenol; bis, tris, polyphenolic anti-aging agents such as tetrakis-[methylene-3-(3',5'-di-t-butyl-4'-hydroxyphenyl)propionate]methane. These may be used alone or in combination of two or more.

As the anti-aging agent, for example, products of Seiko Chemical Co., Ltd., Sumitomo Chemical Co., Ltd., Ouchi Shinko Chemical Industry Co., Ltd., Flexsys Co., Ltd., etc. can be used.

(b-4) Stearic Acid

The rubber composition may contain stearic acid. Content of stearic acid is, for example, more than 0.5 parts by mass and less than 10.0 parts by mass with respect to 100 parts by mass of the rubber component. As the stearic acid, conventionally known ones can be used, and, for example, products of NOF Corporation, NOF Corporation, Kao Corporation, Fuji film Wako Pure Chemical Industries, Ltd., and Chiba Fatty Acid Co., Ltd., etc. can be used.

(b-5) Zinc Oxide

The rubber composition may contain zinc oxide. Content of zinc oxide is, for example, more than 0.5 parts by mass and less than 10 parts by mass with respect to 100 parts by mass of the rubber component. As the zinc oxide, conventionally known ones can be used, for example, products of Mitsui Metal Mining Co., Ltd., Toho Zinc Co., Ltd., Hakusui Tech Co., Ltd., Shodo Chemical Industry Co., Ltd., Sakai Chemical Industry Co., Ltd., etc. can be used.

(b-6) Wax

The rubber composition preferably contains wax. Content of the wax is, for example, 0.5 to 20 parts by mass, preferably 1.0 to 15 parts by mass, and more preferably 1.5 to 10.0 parts by mass with respect to 100 parts by mass of the rubber component.

The wax is not particularly limited, and examples thereof include petroleum waxes such as paraffin wax and microcrystalline wax; natural waxes such as plant wax and animal wax; and synthetic waxes such as a polymer of ethylene or propylene. These may be used alone or in combination of two or more.

As the wax, for example, products of Ouchi Shinko Chemical Industry Co., Ltd., Nippon Seiro Co., Ltd., and Seiko Kagaku Co., Ltd. can be used.

(b-7) Cross-Linking Agent and Vulcanization Accelerator

The rubber composition preferably contains a cross-linking agent such as sulfur. Content of the cross-linking agent is, for example, more than 0.1 part by mass and less than 10.0 parts by mass with respect to 100 parts by mass of the rubber component.

Examples of sulfur include powdered sulfur, precipitated sulfur, colloidal sulfur, insoluble sulfur, highly dispersible sulfur, and soluble sulfur, which are commonly used in the rubber industry. These may be used alone or in combination of two or more.

As the sulfur, for example, products of Tsurumi Chemical Industry Co., Ltd., Karuizawa Sulfur Co., Ltd., Shikoku Chemicals Corporation, Flexsys Co., Ltd., Nippon Kanryu Kogyo Co., Ltd., Hosoi Chemical Industry Co., Ltd., etc. can be used.

Examples of the cross-linking agent other than sulfur include vulcanizing agents containing a sulfur atom such as Tackirol V200 manufactured by Taoka Chemical Industry Co., Ltd., DURALINK HTS (1,6-hexametdihylene-sodium dithiosulfate dihydrate) manufactured by Flexsys, and KA9188 (1,6-bis (N, N'-dibenzylthiocarbamoyldithio) hexane) manufactured by Lanxess; and organic peroxides such as dicumylperoxide.

The rubber composition preferably contains a vulcanization accelerator. Content of the vulcanization accelerator is, for example, more than 0.3 parts by mass and less than 10.0 parts by mass with respect to 100 parts by mass of the rubber component.

Examples of the vulcanization accelerator include
thiazole-based vulcanization accelerators such as 2-mercaptobenzothiazole, di-2-benzothiazolyl disulfide, and N-cyclohexyl-2-benzothiadylsulfenamide;
thiuram-based vulcanization accelerators such as tetramethylthiuram disulfide (TMTD), tetrabenzyltiuram disulfide (TBzTD), and tetrakis (2-ethylhexyl) thiuram disulfide (TOT-N);

sulfenamide-based vulcanization accelerators such as N-cyclohexyl-2-benzothiazolesulfenamide, N-t-butyl-2-benzothiazolyl sulfenamide, N-oxyethylene-2-benzothiazolesulfenamide, N-oxyethylene-2-benzothiazolesulfenamide, and N, N'-diisopropyl-2-benzothiazolesulfenamide; and guanidine-based vulcanization accelerators such as diphenylguanidine, di-ortho-tolylguanidine and ortho-tolylbiguanidine. These may be used alone or in combination of two or more.

(b-8) Others

In addition to the above components, the tread rubber composition may further contain additives generally used in the tire industry, such as fatty acid metal salts, carboxylic acid metal salts, and organic peroxides. Content of these additives is, for example, more than 0.1 part by mass and less than 200 parts by mass with respect to 100 parts by mass of the rubber component.

(2) Preparation of Tread Rubber Composition

The tread rubber composition is produced by a general method, for example, a manufacturing method including a base kneading step of kneading a rubber component with a filler such as silica or carbon black, and a finish kneading step of kneading the kneaded product obtained in the base kneading step and a cross-linking agent.

The kneading can be performed using a known (sealed) kneader such as a banbury mixer, a kneader, or an open roll.

The kneading temperature of the base kneading step is, for example, higher than 50° C. and lower than 200° C., and the kneading time is, for example, more than 30 seconds and less than 30 minutes. In the base kneading process, in addition to the above components, compounding agents conventionally used in the rubber industry, such as softeners such as oil, stearic acid, zinc oxide, antiaging agents, waxes, and vulcanization accelerators, may be appropriately added and kneaded as needed. Moreover, from the viewpoint of obtaining the tread rubber physical properties of the present disclosure, silica and a coupling agent may be put into a mixer and mixed, and then the rubber component may be added and mixed.

In the finish kneading step, the kneaded product obtained in the base kneading step and the cross-linking agent are kneaded. The kneading temperature of the finish kneading step is, for example, above room temperature and lower than 80° C., and the kneading time is, for example, more than 1 minute and less than 15 minutes. In the finish kneading step, in addition to the above components, a vulcanization accelerator, zinc oxide and the like may be appropriately added and kneaded as needed.

At this time, the complex elastic modulus $E^*_t$, 0° C. tan δ, and 30° C. tan δ of the tread rubber can be adjusted to satisfy the above conditions, by adjusting the blending amount of an inorganic filler such as carbon black or by adjusting the blending amount of an oil or resin component. Further, for example, the glass transition point ($Tg_t$) of the tread rubber can be adjusted by adjusting the type and blending amount of the resin component.

(3) Preparation of Tread Rubber

A tread rubber can be obtained by molding the obtained tread rubber composition into a predetermined shape.

3. Electronic Component Mounting Member

Next, a rubber electronic component mounting member will be described as an example of a specific electronic component mounting member, but as described above, the electronic component mounting member is not limited to rubber.

(1) Rubber Composition Constituting an Electronic Component Mounting Member

The rubber composition constituting the electronic component mounting member (rubber composition for electronic component mounting member) can be formed using the same compounding materials as in the case of the tread rubber composition, except that the rubber components are different.

In the rubber composition for electronic component mounting members in the present embodiment, for example, BR and NBR are used as main rubber components, although other rubbers, for example, dienes such as isoprene-based rubber, SBR, SIBR, and CR, may be used appropriately. The rubber component may be composed alone or in combination of multiple types. In addition, each rubber component may use a single rubber, or may use a plurality of rubbers.

When BR and NBR are used as rubber components, the content of BR in 100 parts by mass of the rubber component is, for example, 40 to 60 parts by mass, and the content of NBR is, for example, 40 to 60 parts by mass. NBR is not particularly limited, and NBR having a corresponding amount of bound acrylonitrile can be used depending on the properties required.

(2) Preparation of Rubber Composition for Electronic Component Mounting Member

The rubber composition for electronic component mounting members can be obtained in the same manner as the production of tread rubber composition described above. At this time, the complex elastic modulus $E^*_r$ can be adjusted to satisfy the above conditions according to the same manner as the production of tread rubber composition, for example, by adjusting the blending amount of an inorganic filler such as carbon black or by adjusting the blending amount of an oil or resin component. Further, for example, the glass transition point ($Tg_r$) of the electronic component mounting member can be adjusted by adjusting the type and blending amount of the resin component.

(3) Production of Electronic Component Mounting Member

Next, the obtained rubber composition for electronic component mounting members is heated and pressurized into a predetermined shape in a vulcanizer to produce an electronic component mounting member. The vulcanization step can be carried out by applying known vulcanization means. The vulcanization temperature is, for example, higher than 120° C. and lower than 200° C., and the vulcanization time is, for example, more than 5 minutes and less than 15 minutes. In addition, although the storage portion and the joint portion of the electronic component mounting member may be made of different materials, it is preferred that they are integrally formed of the same material.

4. Manufacture of Tires (1) Manufacture of Tires Before Mounting Electronic Component Mounting Members In the present disclosure, the tire before mounting the electronic component mounting member can be manufactured by a normal method. That is, first, an unvulcanized tire is produced by molding a tire member such as an inner liner (tire inner member) on a tire molding machine by a normal method.

Specifically, the inner liner is manufactured as a member for ensuring the airtightness of the tire, the carcass as a member that withstands the load, impact, and filling air pressure that the tire receives, and the bead portion as a member for fixing both ends of the carcass on both side edges, and fixing the tire to the rim, are arranged on the forming drum, and then the carcass portion is folded back to wrap the bead portion. Next, a bead reinforcing layer as a member that protects the bead portion and the carcass and withstands bending, a clinch portion, and a sidewall are adhered so as to be outside the bead portion in the tire width direction, and then, these are formed into a toroid shape. After that, a belt as a member that tightens the carcass and increases the rigidity of the tread, or the like is wound around the central portion of the outer circumference and the tread is further arranged on the outer circumference to produce an unvulcanized tire.

Then, the produced unvulcanized tire is heated and pressed in a vulcanizer to obtain a tire to which the electronic component mounting member is not mounted. The vulcanization step can be carried out by applying a known vulcanization means. The vulcanization temperature is, for example, higher than 120° C. and lower than 200° C., and the vulcanization time is, for example, more than 5 minutes and less than 15 minutes.

(2) Mounting of Electronic Component Mounting Member

Next, using a predetermined adhesive, an electronic component mounting member separately manufactured is mounted to the central portion in the tire width direction of the surface (inner cavity surface) of the tire inner member of the manufactured tire to complete the production of tire of the present embodiment. Note that the electronic component is stored in the electronic component mounting member after the electronic component mounting member is manufactured. Further, instead of mounting the electronic component mounting member to the vulcanized tire with an adhesive, the unvulcanized tire and the electronic component mounting member may be vulcanized at the same time. However, it becomes difficult by this method to replace the electronic component mounting member, it is preferable to mount the electronic component mounting member to the vulcanized tire with an adhesive.

Specifically, it is preferable to mount the electronic component mounting member with an adhesive after removing the release agent which is generally coated on the surface of the tire inner member (inner cavity) in order to maintain releasability during vulcanization. The following two methods are conceivable for removing the release agent.

The first method is to scrape off the release agent using a polishing machine such as a buffing machine (buffing). By using a polishing machine, large unevenness is eliminated and the surface is roughened to ensure a sufficient contact area for adhesion.

The second method is a method of scraping off the release agent using a laser (laser polishing), which enables polishing with higher precision than a polishing machine and smooths the contact surface with the electronic component mounting member. Therefore, it is considered that the peeling resistance is excellent.

Note that the laser polishing method can be distinguished from other polishing methods by confirming that the level difference on the inner surface of the tire at the interface between the polished portion and the unpolished portion is 200 μm or less. The unpolished portion includes a release agent layer during vulcanization.

As another method, the release agent is not applied only to the place where the electronic component mounting member is to be mounted, when applying a release agent to the inner cavity surface of an unvulcanized tire, and an electronic component mounting member may be mounted on that place after vulcanization.

As the adhesive, it is possible to use an adhesive that is usually used for bonding rubber members. The adhesive is preferably a rubber-based adhesive that can maintain its softness even after curing.

5. Usage

The tire of the present disclosure described above may be a pneumatic tire or a non-pneumatic tire. In addition, it can be applied to various uses such as tires for passenger cars, tires for large vehicles, tires for two-wheeled vehicles, tires for agriculture, tires for mining, and tires for aircraft, but a pneumatic tire for passenger cars is most preferred. The term "passenger car tire" as used herein refers to a tire mounted on a four-wheeled vehicle and having a maximum load capacity of 1000 kg or less.

The maximum load capacity is not particularly limited as long as it is 1000 kg or less, but in general, as the maximum load capacity increases, the tire weight tends to increase and the impact transmitted to the tire tends to increase, so it is preferably 900 kg or less, more preferably 800 kg or less and further preferably 700 kg or less.

The tire weight is preferably 20 kg or less, more preferably 15 kg or less, further preferably 12 kg or less, 10 kg or less, and 8 kg or less, from the viewpoint of softening the impact transmitted to the tire. The term "tire weight" as used herein includes the weight of the electronic component and the electronic component mounting member, and also includes sealant, sponge, etc., when they are provided in the inner cavity.

EXAMPLE

Hereinafter, the present disclosure will be described more specifically based on examples.

In the following examples, two types of tires (sizes: 205/55R16 and 235/55R18) having the configuration shown in FIG. 1 were manufactured, and the peeling resistance performance of the electronic component mounting member from the tire was evaluated. Here, in order to directly obtain the effect of comparing the physical properties of the electronic component mounting member and the tread rubber, the electronic component mounting member was fixed to one type and the experiment was conducted.

1. Compounding Material

First, various compounding materials for the tread rubber composition and the rubber composition for electronic component mounting members were prepared.

(1) Rubber component
  (a) NR: TSR20
  (b) SBR1: Europrene SOL R C2525 manufactured by Versalis
  (c) SBR2: HPR850 manufactured by JSR Corporation
  (d) BR: UBEPOL-BR150 manufactured by Ube Industries, Ltd.
  (e) NBR: Nipol DN401LL manufactured by Nippon Zeon Co., Ltd.

(2) Compounding materials other than rubber components
  (a) Reinforcing agent 1 (silica): Ultrasil VN3 manufactured by Evonik Degussa ($N_2SA$: 175 $m^2/g$)
  (b) Reinforcing agent 2 (carbon black): Diablack N220 manufactured by Mitsubishi Chemical Corporation
  (c) Silane coupling agent: Si266 manufactured by Degussa (bis (3-triethoxysilylpropyl) disulfide)
  (d) Oil: Process X-260 manufactured by Japan Energy Co., Ltd.
  (e) Resin: SYLVATRAXX 4401 manufactured by Arizona Chemical Co. (α-methylstyrene resin)

(f) Wax: Ozoace 0355 manufactured by Nippon Seiro Co., Ltd.
(g) Antiaging agent 1: Nocrac 6C manufactured by Ouchi Shinko Chemical Industry Co., Ltd. (N-phenyl-N'-(1,3-dimethylbutyl)-p-phenylenediamine)
(h) Antiaging agent 2: Antage RD manufactured by Kawaguchi Chemical Industry Co., Ltd. (2,2,4-trimethyl-1,2-dihydroquinoline)
(i) Zinc oxide: two types of zinc oxide manufactured by Mitsui Mining & Smelting Co., Ltd.
(j) Stearic acid: TSUBAKI manufactured by NOF Corporation
(k) Sulfur: HK-200-5 (containing oil 5% by mass) manufactured by Hosoi Chemical Co., Ltd.
(l) Vulcanization accelerator 1: Nocceler CZ-G (CBS) manufactured by Ouchi Shinko Chemical Industry Co., Ltd.
(N-cyclohexyl-2-benzothiazolylsulfenamide)
(m) Vulcanization accelerator 2: Nocceler D (DPG) manufactured by Ouchi Shinko Chemical Industry Co., Ltd. (1,3-Diphenylguanidine)

2. Manufacture of Tread Rubber (1) Production of Tread Rubber Composition

First, a tread rubber composition was produced. Specifically, materials other than zinc oxide, sulfur and a vulcanization accelerator were kneaded at 150° C. for 5 minutes using a Banbury mixer according to the formulation contents shown in Table 1 to obtain a kneaded product. Note, each compounding quantity is a mass part.

TABLE 1

| | FORMULATION | | | | | | |
|---|---|---|---|---|---|---|---|
| | 1 | 2 | 3 | 4 | 5 | 6 | 7 |
| NR | 10 | 10 | 10 | 10 | 10 | 10 | 10 |
| SBR1 | 55 | | | | | | |
| SBR2 | | 55 | 55 | 55 | 55 | 55 | 45 |
| BR | 35 | 35 | 35 | 35 | 35 | 35 | 45 |
| Reinforcing agent 1 | 60 | 55 | 50 | 47 | 45 | 65 | 75 |
| Reinforcing agent 2 | 5 | 5 | 5 | 5 | 5 | 5 | 5 |
| Coupling agent | 6 | 5.5 | 5 | 4.5 | 4.5 | 6 | 7.5 |
| Oil | 5 | 3 | 5 | 0 | 13 | 15 | 20 |
| Resin | 3 | 3 | 3 | 2 | 3 | 3 | 8 |
| Wax | 1 | 1 | 1 | 1 | 1 | 1 | 1 |
| Antiaging agent 1 | 2 | 2 | 2 | 2 | 2 | 2 | 2 |
| Antiaging agent 2 | 1.5 | 1.5 | 1.5 | 1.5 | 1.5 | 1.5 | 1.5 |
| Zinc oxide | 2 | 2 | 2 | 2 | 2 | 2 | 2 |
| Stearic acid | 2 | 2 | 2 | 2 | 2 | 2 | 2 |
| Sulfur | 2 | 2 | 2 | 2 | 2 | 2 | 2 |
| Vulcanization accelerator 1 | 2 | 2 | 2 | 2 | 2 | 2 | 2 |
| Vulcanization accelerator 2 | 1 | 1 | 1 | 1 | 1 | 1 | 1 |

Next, zinc oxide, sulfur and a vulcanization accelerator were added to the resulting kneaded material and kneaded for 5 minutes at 80° C. using an open roll to obtain a tread rubber composition.

(2) Manufacture of Tread Rubber

Using the obtained tread rubber composition, tread rubbers having thicknesses shown in Tables 3 to 6 were formed.

3. Manufacture of Electronic Component Mounting Materials

Separately, an electronic component mounting member was manufactured.

(1) Manufacture of Rubber Composition for Electronic Component Mounting Member

First, using a Banbury mixer, materials other than zinc oxide, sulfur and a vulcanization accelerator were kneaded at 150° C. for 5 minutes according to the formulation contents shown in Table 2 to obtain a kneaded product. Note, each compounding quantity is a mass part.

TABLE 2

| | FORMULATION | | |
|---|---|---|---|
| | 8 | 9 | 10 |
| BR | 50 | 50 | 50 |
| NBR | 50 | 50 | 50 |
| Reinforcing agent 2 | 40 | 35 | 30 |
| Oil | 6 | 10 | 15 |
| Wax | 1 | 1 | 1 |
| Antiaging agent | 3 | 3 | 3 |
| Zinc oxide | 3 | 3 | 3 |
| Stearic acid | 2 | 2 | 2 |
| Sulfur | 2 | 2 | 2 |
| Vulcanization accelerator 2 | 1 | 1 | 1 |

Next, zinc oxide, sulfur and a vulcanization accelerator are added to the resulting kneaded product, and kneaded for 5 minutes at 80° C. using an open roll to obtain a rubber composition for electronic component mounting members.

(2) Manufacture of Electronic Component Mounting Member

Next, the obtained rubber composition for an electronic component mounting member was vulcanized into the shape shown in FIG. 3, that is, the shape having a storage space S with a circular cross section, to produce electronic component mounting members in two sizes, 4 cm in diameter and 8 mm in thickness dr, and 4 cm in diameter and 12 mm in thickness dr. The combined weight of the electronic component and the electronic component mounting member was 25±0.5 g and 27±0.5 g for each size.

4. Manufacture of Test Tires (1) Manufacture of Tires Before Mounting Electronic Component Mounting Members First, a tire before mounting the electronic component mounting member having a size of 205/55R16 was manufactured.

Specifically, the tread rubbers having the formulations and thicknesses shown in Tables 3 and 4 were pasted together with other tire members to form an unvulcanized tire, which was then press-vulcanized at 170° C. for 10 minutes, and a tire before mounting the electronic component mounting member was obtained. Note that the thickness dt of the tread rubber was set to 8 mm.

(2) Manufacture of Test Tires

Next, on the inner cavity surface of the tire before mounting each electronic component mounting member, mounting locations for the electronic component mounting member shown in Tables 3 and 4 were polished by the polishing method shown in Tables 3 and 4 to remove the release agent, and an electronic component mounting member storing a predetermined electronic component in the storage space in advance was mounted using an adhesive to manufacture each test tire of Examples 1 to 12 and Comparative Examples 1 to 6. The weight of the tire obtained was in the range of 7.6±0.2 kg. As the adhesive, a commercially available chloroprene rubber adhesive was used.

In the laser polishing, a laser beam adjusted to a movement pitch of 60 μm and a movement speed of 4000 mm/s was used to reciprocate the mounting location of the electronic component mounting member several times to scrape off the release agent and rubber surface, resulting in a step of 95 μm.

Note that, in the "mounting locations of the electronic component mounting members" shown in Tables 3 and 4, the "crown" means the central two areas closest to the tire equatorial plane, that is, indicating that the center of the joint surface of the electronic component mounting member locates in the areas 34 in FIG. 2 and the centerline cl of the electronic component mounting member does not pass through the circumferential groove. Further, "middle" means the area outside the central two areas, that is, indicating that the center of the joint surface of the electronic component mounting member locates in the area 35 in FIG. 2, and the centerline cl of the electronic component mounting member does not pass through the circumferential groove. Further, the "groove back" indicates that the center line cl of the electronic component mounting member passes through the circumferential groove. The "distance between the block and the mounter" means the distance between the center of the block (and portion) through which the center line cl of the electronic component mounting member passes among the blocks of the tread pattern and the center line cl of the electronic component mounting member.

Next, for tires of size: 235/55R18, test tires of Examples 13 to 24 (Table 5) and Comparative Examples 7 to 12 (Table 6) were manufactured in the same manner as described above. The weight of the obtained tire was in the range of 13.6±0.3 kg.

5. Calculation of Parameters

After that, a rubber test piece was produced from the tread rubber and the electronic component mounting member of each test tire. From the tread rubber, a viscoelasticity measurement sample of length 20 mm×width 4 mm×thickness 1 mm was collected so that the tire circumferential direction was the long side, and from the electronic component mounting member, a viscoelasticity measurement sample of length 20 mm×width 4 mm×thickness 1 mm was collected from the joint portion.

For each rubber test piece and for the viscoelasticity measurement sample collected from the tread rubber, using an Eplexor series manufactured by GABO, loss tangent (0° C. tan δ) was measured under the conditions of the temperature of 0° C., the initial strain of 10%, the dynamic strain rate of ±2.5%, the frequency of 10 Hz, and deformation mode: tension; and the complex elastic modulus ($E^*_t$) and loss tangent (30° C. tan δ) were measured under the conditions of the temperature of 30° C., the initial strain of 5%, the dynamic strain rate of ±1%, the frequency of 10 Hz, and, deformation mode: elongation and tension, respectively.

Then, for the viscoelasticity measurement sample collected from the electronic component mounting member, the complex elastic modulus ($E^*r$) was measured under the conditions of the temperature: 30° C., initial strain: 5%, dynamic strain: ±1%, frequency: 10 Hz, and deformation mode: tension.

Further, the Tg (° C.) of the tread rubber and the electronic component mounting member of each test tire, that is, $Tg_t$(° C.) and $Tg_r$(° C.) were calculated by the following method.

A temperature distribution curve of tan δ was measured using a GABO Eplexor series under the conditions of the frequency of 10 Hz, the initial strain of 10%, the amplitude of 0.5%, and the heating rate of 2° C./min. Then, the tan δ peak temperature corresponding to the largest tan δ value in the measured temperature distribution curve was defined as the glass transition point (Tg).

Tables 3 to 6 show the results of each measurement. The complex elastic modulus, loss tangent, and Tg (° C.) are measured for each manufactured test tire, and the average values are shown for those using the same rubber composition.

Next, $E^*_r/E^*_t$ and $Tg_r-Tg_t$ for each test tire were calculated based on the above measurement results. The results are shown in Tables 3-6.

6. Evaluation Test

The evaluation was made on the peeling resistance during actual high-speed running.

(1) Test Method

Each test tire is installed on all wheels of a vehicle (domestic FF vehicle, displacement 2000 cc), and after filling air so that the internal pressure is 230 kPa, the vehicle ran at a speed of 80 km/h on a dry road test course. After running, it was observed whether the electronic component mounting member was peeled off from the inner cavity surface of the tire.

When the member was not peeled off, the running speed was increased to 100 km/h, 110 km/h, 120 km/h, 130 km/h, and 140 km/h, and similar observations were made. Then, the speed at which the electronic component mounting member was peeled off was obtained.

Next, the result in Example 1 was set to 100, and indexed based on the following formula to relatively evaluate the anti-peeling performance during actual high-speed running. The larger the numerical value, the better the anti-peeling performance during actual high-speed running, and the less likely it is to peel.

Peeling resistance during actual high-speed running=
[(result of test tire)/(result of Example 1)]×100

(2) Evaluation Results

Evaluation results are shown in Tables 3 to 6.

TABLE 3

| Size 205/55R16 | EXAMPLE | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Formulation of Tread Rubber | 1 | 1 | 1 | 1 | 1 | 2 | 3 | 4 | 4 | 4 | 6 | 7 |
| Formulation of Electronic component mounting member | 8 | 8 | 8 | 9 | 10 | 9 | 9 | 9 | 9 | 9 | 9 | 9 |
| Polishing method | Buffing | Buffing | Buffing | Buffing | Buffing | Buffing | Buffing | Buffing | Buffing | laser polishing | Buffing | Buffing |
| [Parameter] | | | | | | | | | | | | |
| $E^*_t$ | 10 | 10 | 10 | 10 | 10 | 10 | 9 | 9 | 9 | 9 | 9 | 10 |
| $E^*_r$ | 8 | 8 | 8 | 6 | 1 | 6 | 6 | 6 | 6 | 6 | 6 | 6 |
| $E^*_r/E^*_t$ | 0.80 | 0.80 | 0.80 | 0.60 | 0.40 | 0.60 | 0.67 | 0.67 | 0.67 | 0.67 | 0.67 | 0.60 |
| 0° C. tan δ | 0.25 | 0.25 | 0.25 | 0.25 | 0.25 | 0.3 | 0.3 | 0.35 | 0.35 | 0.35 | 0.35 | 0.3 |

TABLE 3-continued

| Size 205/55R16 | EXAMPLE | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 30° C. tanδ | 0.2 | 0.2 | 0.2 | 0.2 | 0.2 | 0.15 | 0.13 | 0.1 | 0.1 | 0.1 | 0.2 | 0.2 |
| Thickness dt(mm) of the Tread rubber | 8 | 8 | 8 | 8 | 8 | 8 | 8 | 8 | 8 | 8 | 8 | 8 |
| Thickness dr(mm) of the Electronic component mounting member | 12 | 12 | 12 | 12 | 12 | 12 | 12 | 12 | 8 | 8 | 12 | 12 |
| dr/dt | 1.5 | 1.5 | 1.5 | 1.5 | 1.5 | 1.5 | 1.5 | 1.5 | 1 | 1 | 1.5 | 1.5 |
| $Tg_t$(° C.) | −40 | −40 | −40 | −40 | −40 | −17 | −17 | −17 | −17 | −17 | −19 | −18 |
| $Tg_r$(° C.) | −35 | −35 | −35 | −35 | −35 | −35 | −35 | −35 | −35 | −35 | −35 | −35 |
| $Tg_t - Tg_r$(° C.) | −5 | −5 | −5 | −5 | −5 | 18 | 18 | 18 | 18 | 18 | 16 | 17 |
| Mounting locations for the electronic component mounting member | middle | crown | crown | crown | crown | crown | crown | crown | crown | crown | crown | crown |
| Distance between the block and the mounter(mm) | 7 | 7 | 2 | 2 | 2 | 2 | 2 | 2 | 2 | 2 | 2 | 2 |
| [Evaluation results] | | | | | | | | | | | | |
| Peeling resistance during actual high-speed running | 100 | 108 | 113 | 118 | 110 | 123 | 128 | 133 | 138 | 148 | 119 | 120 |

TABLE 4

| Size: 205/55R16 | COPMPARATIVE EXAMPLE | | | | | |
|---|---|---|---|---|---|---|
| | 1 | 2 | 3 | 4 | 5 | 6 |
| Formulation of Tread Rubber | 1 | 2 | 3 | 4 | 4 | 5 |
| Formulation of Electronic component mounting member | 8 | 8 | 8 | 8 | 8 | 8 |
| Polishing method | Buffing | Buffing | Buffing | Buffing | Buffing | Buffing |
| [Parameter] | | | | | | |
| $E_t^*$ | 10 | 10 | 9 | 9 | 9 | 7 |
| $E_r^*$ | 8 | 8 | 8 | 8 | 8 | 8 |
| $E_r^*/E_t^*$ | 0.80 | 0.80 | 0.89 | 0.89 | 0.89 | 1.14 |
| 0° C. tanδ | 0.25 | 0.3 | 0.3 | 0.35 | 0.35 | 0.3 |
| 30° C. tanδ | 0.15 | 0.15 | 0.13 | 0.1 | 0.1 | 0.1 |
| Thickness dt (mm) of the Tread rubber | 8 | 8 | 8 | 8 | 8 | 8 |
| Thickness dr (mm) of the Electronic component mounting member | 12 | 12 | 12 | 12 | 8 | 12 |
| $d_r/d_t$ | 1.5 | 1.5 | 1.5 | 1.5 | 1 | 1.5 |
| $Tg_t$(° C.) | −40 | −18 | −17 | −17 | −17 | −19 |
| $Tg_r$(° C.) | −35 | −35 | −35 | −35 | −35 | −35 |
| $Tg_t - Tg_r$(° C.) | −5 | 17 | 18 | 18 | 18 | 16 |
| Mounting locations for the electronic component mounting member | groove back | groove back | groove back | groove back | groove back | crown |
| Distance between the block and the mounter (mm) | — | — | — | — | — | 2 |
| [Evaluation results] | | | | | | |
| Peeling resistance during actual high-speed running | 70 | 75 | 80 | 85 | 90 | 80 |

TABLE 5

| Size: 235/55R18 | EXAMPLE | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| Formulation of Tread Rubber | 1 | 1 | 1 | 1 | 1 | 2 | 3 | 4 | 4 | 4 | 6 | 7 |
| Formulation of Electronic component mounting member | 8 | 8 | 8 | 9 | 10 | 9 | 9 | 9 | 9 | 9 | 9 | 9 |
| Polishing method | Buffing | Buffing | Buffing | Buffing | Buffing | Buffing | Buffing | Buffing | Buffing | laser polishing | Buffing | Buffing |
| [Parameter] | | | | | | | | | | | | |
| $E_t^*$ | 10 | 10 | 10 | 10 | 10 | 10 | 9 | 9 | 9 | 9 | 9 | 10 |
| $E_r^*$ | 8 | 8 | 8 | 6 | 4 | 6 | 6 | 6 | 6 | 6 | 6 | 6 |
| $E_r^*/E_t^*$ | 0.80 | 0.80 | 0.80 | 0.60 | 0.40 | 0.60 | 0.67 | 0.67 | 0.67 | 0.67 | 0.67 | 0.60 |
| 0° C. tanδ | 0.25 | 0.25 | 0.25 | 0.25 | 0.25 | 0.3 | 0.3 | 0.35 | 0.35 | 0.35 | 0.35 | 0.3 |
| 30° C. tanδ | 0.2 | 0.2 | 0.2 | 0.2 | 0.2 | 0.15 | 0.13 | 0.1 | 0.1 | 0.1 | 0.2 | 0.2 |
| Thickness dt(mm) of the Tread rubber | 8 | 8 | 8 | 8 | 8 | 8 | 8 | 8 | 8 | 8 | 8 | 8 |
| Thickness dr(mm) of the Electronic component mounting member dr | 12 | 12 | 12 | 12 | 12 | 12 | 12 | 12 | 8 | 8 | 12 | 12 |
| $d_r/d_t$ | 1.5 | 1.5 | 1.5 | 1.5 | 1.5 | 1.5 | 1.5 | 1.5 | 1 | 1 | 1.5 | 1.5 |
| $Tg_t$(° C.) | −40 | −40 | −40 | −40 | −40 | −17 | −17 | −17 | −17 | −17 | −19 | −18 |
| $Tg_r$(° C.) | −35 | −35 | −35 | −35 | −35 | −35 | −35 | −35 | −35 | −35 | −35 | −35 |
| $Tg_t - Tg_r$(° C.) | −5 | −5 | −5 | −5 | −5 | 18 | 18 | 18 | 18 | 18 | 16 | 17 |
| Mounting locations for the electronic component mounting member | middle | crown | crown | crown | crown | crown | crown | crown | crown | crown | crown | crown |
| Distance between the block and the mounter(mm) | 7 | 7 | 2 | 2 | 2 | 2 | 2 | 2 | 2 | 2 | 2 | 2 |
| [Evaluation results] | | | | | | | | | | | | |
| Peeling resistance during actual high-speed running | 100 | 106 | 110 | 115 | 107 | 115 | 121 | 125 | 130 | 140 | 113 | 115 |

TABLE 6

| Size: 235/55R18 | COMPARATIVE EXAMPLE | | | | | |
|---|---|---|---|---|---|---|
| | 7 | 8 | 9 | 10 | 11 | 12 |
| Formulation of Tread Rubber | 1 | 2 | 3 | 4 | 4 | 5 |
| Formulation of Electronic component mounting member | 8 | 8 | 8 | 8 | 8 | 8 |
| Polishing method | Buffing | Buffing | Buffing | Buffing | Buffing | Buffing |
| [Parameter] | | | | | | |
| $E_t^*$ | 10 | 10 | 9 | 9 | 9 | 7 |
| $E_r^*$ | 8 | 8 | 8 | 8 | 8 | 8 |
| $E_r^*/E_t^*$ | 0.80 | 0.80 | 0.89 | 0.89 | 0.89 | 1.14 |
| 0° C. tanδ | 0.25 | 0.3 | 0.3 | 0.35 | 0.35 | 0.3 |
| 30° C. tanδ | 0.15 | 0.15 | 0.13 | 0.1 | 0.1 | 0.1 |
| Thickness dt (mm) of the Tread rubber | 8 | 8 | 8 | 8 | 8 | 8 |
| Thickness dr (mm) of the Electronic component mounting member | 12 | 12 | 12 | 12 | 8 | 12 |
| $d_r/d_t$ | 1.5 | 1.5 | 1.5 | 1.5 | 1 | 1.5 |
| $Tg_t$(° C.) | −40 | −18 | −17 | −17 | −17 | −19 |
| $Tg_r$(° C.) | −35 | −35 | −35 | −35 | −35 | −35 |
| $Tg_t - Tg_r$(° C.) | −5 | 17 | 18 | 18 | 18 | 16 |
| Mounting locations for the electronic component mounting member | groove back | groove back | back groove | back groove | back groove | crown |
| Distance between the block and the mounter (mm) | — | — | — | — | — | 2 |
| [Evaluation results] | | | | | | |
| Peeling resistance during actual high-speed running | 75 | 78 | 83 | 88 | 92 | 83 |

From the comparison of the examples and comparative examples in Tables 3 to 6, it can be seen that a tire exhibiting excellent peeling resistance during actual high-speed running can be provided, when the center line cl of the electronic component mounting member, that is, the line passing through the center point of the joint surface and perpendicular to the surface profile of the tread portion does not pass the circumferential grooves formed on the surface of tread and $E^*_r/E^*_t<1$ is satisfied (Example).

Further, from a comparison between Examples, it can be seen that Examples 6 to 12 and Examples 18 to 24 having 0° C. tan δ of 0.30 or more are excellent in peeling resistance during high-speed running, Examples 7 to 10 and Examples 19 to 22 having 30° C. tan δ of 13 or less are more excellent, and Examples 8 to 10 and Examples 20 to 22 having 0° C. tan δ of 0.35 or more and 30° C. tan δ of 0.10 or less are further more excellent.

Moreover, it can be seen that Examples 9 and 10 and Examples 21 and 22, in which $d_r/d_t$ is smaller than 1.25, are further more excellent.

Also, it can be seen that Examples 6 to 12 and Examples 18 to 24, in which $Tg_t-Tg_r$ is greater than 0, are excellent.

Moreover, it can be seen that Examples 10 and 22 wherein laser polishing was performed are superior to those in which buffing was performed.

Although the present disclosure has been described above based on the embodiments, the present disclosure is not limited to the above embodiments. Various modifications can be made to the above embodiment within the same and equivalent range as the present disclosure.

The present disclosure (1) is;
- a tire mounting an electronic component mounting member with a built-in electronic component on the surface of the tire inner member, characterized in that,
- the electronic component mounting member includes an electronic component storage portion that stores the electronic component, and a joint portion that includes a joint surface for mounting the electronic component mounting member on the surface of the tire inner member;
- a line passing through the center point of the joint surface of the electronic component mounting member with the tire inner cavity surface and perpendicular to the surface profile of the tread portion does not pass through the circumferential groove formed on the surface of the tread portion; and
- the complex elastic modulus $E^*_r$ (MPa) of the joint portion at 30° C. and the complex elastic modulus $E^*_t$ (MPa) of the tread rubber constituting the tread portion at 30° C. satisfy the following (formula 1).

$$E^*_r/E^*_t<1 \qquad \text{(formula 1)}$$

The present disclosure (2) is the tire according to the present disclosure (1), wherein the tread rubber has a loss tangent at 0° C. (0° C. tan δ) of 0.30 or more.

The present disclosure (3) is the tire according to the present disclosure (1) or (2), wherein the tread rubber has a loss tangent at 30° C. (30° C. tan δ) of 0.13 or less.

The present disclosure (4) is the tire according to the present disclosure (3), wherein the 30° C. tan δ is 0.11 or less.

The present disclosure (5) is the tire of any combination of the present disclosures (1) to (4), wherein, at the joint portion, the thickness $d_r$ (mm) of the electronic component mounting member and the thickness $d_t$ (mm) of the rubber layer of the tread outside the joint portion in the tire radial direction satisfy the following (formula 2).

$$0.25<(d_r/d_t)<1.25 \qquad \text{(formula 2)}$$

The present disclosure (6) is the tire of any combination of the present disclosures (1) to (5), wherein the glass transition point $Tg_r$ (° C.) of the joint portion and the glass transition point $Tg_t$ (° C.) of the tread rubber satisfy the following (formula 3).

$$Tg_t-Tg_r>0 \qquad \text{(formula 3)}$$

The present disclosure (7) is the tire of any combination of the present disclosures (1) to (6), wherein the electronic component mounting member is mounted on a surface of a tire inner member which is polished in advance.

The present disclosure (8) is the tire according to the present disclosure (7), wherein the polishing treatment is a polishing treatment using a laser.

The present disclosure (9) is the tire of any combination of the present disclosures (1) to (8), wherein the electronic component mounting member is mounted on the surface of the tire inner member using an adhesive.

The present disclosure (10) is the tire of any combination of the present disclosures (1) to (9), wherein the center of said electronic component mounting member locates in the central two areas that are closest to the tire equatorial plane in the tire cross section, among the four areas divided by the lines that extend parallel to the tire radial direction from the lines that divide between the two tread edges forming the tread contact width into four equal parts.

The present disclosure (11) is the tire of any combination of the present disclosures (1) to (10), wherein the deviation between a straight line passing through the center line of the joint surface of the electronic component mounting member and the center of the tread land portion is within ±10 mm.

The present disclosure (12) is the tire of any combination of the present disclosures (1) to (01), which is a tire for a passenger car.

DESCRIPTION OF REFERENCE SIGNS

1 Tire
2 Electronic component mounting member
3 Surface of tread
11 Tread
12 Belt
13 Sidewall
14 Carcass layer
15 Bead core
16 Bead Apex
17 Chafer
18 Clinch
19 Tire inner member (inner liner)
21 Electronic component storage portion
22 Joint portion
31 Circumferential groove
32a,32d Lateral groove
33 Sipes
34 Area closest to equatorial plane
35 Tire axially outer area
dt Thickness of tread rubber layer
dr Thickness of electronic component mounting member
A Joint surface
CL Center line of tire
cl Center line of electronic component mounting member
$E_1$ Upper end (on the side facing the joint surface of the electronic component storage portion)

E₂ Lower end (on the joint surface side of the electronic component storage portion)
I Tire inner cavity surface
S Storage space
VL Virtual line

What is claimed is:

1. A tire comprising an electronic component mounting member mounted on an inner surface of the tire, characterized in that, the electronic component mounting member includes an electronic component storage portion that stores the electronic component, and a joint portion that includes a joint surface for mounting the electronic component mounting member on the inner surface of the tire;

a line passing through the center point of the joint surface of the electronic component mounting member with the tire inner cavity surface and perpendicular to the surface profile of the tread portion does not pass through the circumferential groove formed on the surface of the tread portion;

the complex elastic modulus $E^*r$ (MPa) of the joint portion at 30° C. and the complex elastic modulus $E^*t$ (MPa) of the tread rubber constituting the tread portion at 30° C. satisfy the following (formula 1)

$$E^*_r/E^*_t<1 \qquad \text{(formula 1)},$$

at the joint portion, the thickness dr (mm) of the electronic component mounting member and the thickness dt (mm) of the rubber layer of the tread outside the joint portion in the tire radial direction satisfy the following (formula 2)

$$0.25<(dr/dt)<1.25 \qquad \text{(formula 2), and}$$

the glass transition point Tgr (° C.) of the joint portion and the glass transition point Tgt (° C.) of the tread rubber satisfy the following (formula 3), $$Tgt-Tgr>0 \qquad \text{(formula 3)},$$

wherein $Tg_t$ is 0° C. or lower and Tgr is −35° C. or higher.

2. The tire according to claim 1, wherein the tread rubber has a loss tangent at 0° C. (0° C. tan δ) of 0.30 or more.

3. The tire according to claim 1, wherein the tread rubber has a loss tangent at 30° C. (30° C. tan δ) of 0.13 or less.

4. The tire according to claim 3, wherein the 30° C. tan δ is 0.11 or less.

5. The tire according to claim 1, wherein the electronic component mounting member is mounted on the inner surface of the tire which is polished in advance.

6. The tire according to claim 5, wherein the polishing treatment is a polishing treatment using a laser.

7. The tire according to claim 1, wherein the electronic component mounting member is mounted on the member inner surface of the tire using an adhesive.

8. The tire according to claim 1, wherein the center of said electronic component mounting member locates in the central two areas that are closest to the tire equatorial plane in the tire cross section, among the four areas divided by the lines that extend parallel to the tire radial direction from the lines that divide between the two tread edges forming the tread contact width into four equal parts.

9. The tire according to claim 1, wherein the deviation between a straight line passing through the center line of the joint surface of the electronic component mounting member and the center of the tread land portion is within ±10 mm.

10. The tire according to claim 1, which is a tire for a passenger car.

* * * * *